US011375145B2

(12) United States Patent
Otaka

(10) Patent No.: US 11,375,145 B2
(45) Date of Patent: Jun. 28, 2022

(54) SOLID-STATE IMAGING DEVICE, METHOD FOR DRIVING SOLID-STATE IMAGING DEVICE, AND ELECTRONIC APPARATUS

(71) Applicant: BRILLNICS SINGAPORE PTE. LTD., Singapore (SG)

(72) Inventor: Toshinori Otaka, Tokyo (JP)

(73) Assignee: BRILLNICS SINGAPORE PTE. LTD., Singapore (SG)

( * ) Notice: Subject to any disclaimer, the term of this patent is extended or adjusted under 35 U.S.C. 154(b) by 0 days.

(21) Appl. No.: 16/612,326

(22) PCT Filed: May 7, 2018

(86) PCT No.: PCT/JP2018/017623
§ 371 (c)(1),
(2) Date: Nov. 8, 2019

(87) PCT Pub. No.: WO2018/207731
PCT Pub. Date: Nov. 15, 2018

(65) Prior Publication Data
US 2021/0144330 A1 May 13, 2021

(30) Foreign Application Priority Data
May 10, 2017 (JP) .............................. JP2017-093716

(51) Int. Cl.
*H04N 5/374* (2011.01)
*H04N 5/3745* (2011.01)
(Continued)

(52) U.S. Cl.
CPC ....... *H04N 5/37452* (2013.01); *H04N 5/3454* (2013.01); *H04N 5/3698* (2013.01);
(Continued)

(58) Field of Classification Search
None
See application file for complete search history.

(56) References Cited

U.S. PATENT DOCUMENTS

2001/0007471 A1   7/2001   Beiley
2005/0146617 A1   7/2005   Hashimoto et al.
(Continued)

FOREIGN PATENT DOCUMENTS

JP    2009004834 A    1/2009
JP    2011078103 A    4/2011
(Continued)

OTHER PUBLICATIONS

Aoki et al., A Rolling-Shutter Distortion-Free 3D Stacked Image Sensor with -160dB Parasitic Light Sensitivity In-Pixel Storage Node, 2013 IEEE International Solid-State Circuits Conference, Feb. 20, 2013, pp. 482-484, Session 27, 27.3.
(Continued)

*Primary Examiner* — Twyler L Haskins
*Assistant Examiner* — Wesley J Chiu
(74) *Attorney, Agent, or Firm* — Pillsbury Winthrop Shaw Pittman LLP

(57) ABSTRACT

In a solid-state imaging device 10, a signal retaining part 212 is provided with a first sampling part 2122 and a second sampling part 2123, each of which is formed by one sampling transistor (1T) and one sampling capacitor (1C). The coupling node between the two sampling parts is a retaining node ND23, which is used as a bidirectional port. With such a configuration, the solid-state imaging device 10 is configured as a solid-state imaging element having a global shutter function that achieves substantially the same signal amplitude as in the differential reading scheme with four transistors. Thus, the solid-state imaging device 10 can achieve the reduced increase in number of transistors, prevent the occur-
(Continued)

rence of signal amplitude loss in the sampling parts, maintain high pixel sensitivity and reduce input conversion noise.

18 Claims, 12 Drawing Sheets

(51) Int. Cl.
 H04N 5/369 (2011.01)
 H04N 5/345 (2011.01)
 H04N 5/378 (2011.01)
(52) U.S. Cl.
 CPC ............ H04N 5/378 (2013.01); H04N 5/379 (2018.08); H04N 5/3741 (2013.01)

(56) References Cited

U.S. PATENT DOCUMENTS

| | | | |
|---|---|---|---|
| 2006/0186313 A1* | 8/2006 | Yokota | H04N 5/3765 250/208.1 |
| 2012/0008029 A1 | 1/2012 | Matsuda et al. | |
| 2013/0229560 A1 | 9/2013 | Kondo | |
| 2014/0139713 A1* | 5/2014 | Gomi | H04N 5/379 348/308 |
| 2015/0341582 A1* | 11/2015 | Sakaguchi | H01L 27/14612 348/301 |
| 2016/0088249 A1* | 3/2016 | Funaki | H01L 27/14634 348/296 |
| 2016/0088251 A1* | 3/2016 | Luo | H04N 5/37452 250/208.1 |
| 2016/0381308 A1 | 12/2016 | Raynor | |
| 2018/0054576 A1* | 2/2018 | Otaka | H04N 5/3559 |
| 2018/0091723 A1* | 3/2018 | Funaki | H04N 5/363 |
| 2018/0295303 A1* | 10/2018 | Murao | H04N 5/363 |

FOREIGN PATENT DOCUMENTS

| | | |
|---|---|---|
| JP | 2012248952 A | 12/2012 |
| JP | 2015177355 A | 10/2015 |

OTHER PUBLICATIONS

Kondo et al., A 3D stacked CMOS image sensor with 16M pixel global-shutter mode using 4 million interconnections, ITE Transactions on Media Technology and Applications, 2016, pp. 1-4.

Inoue et al., A CMOS Active Pixel Image Sensor with In-pixel CDS for High-Speed Cameras, SPIE Electronic Imaging 2004, 2004, pp. 250-257, vol. 5301, San Jose, California, United States.

Patent Cooperation Treaty, International Search Report for PCT/JP2018/017623, dated Jul. 24, 2018, pp. 1-2.

Patent Cooperation Treaty, International Written Opinion for PCT/JP2018/017623, dated Jul. 24, 2018, pp. 1-5.

European Patent Office, Examination Report issued in EP 18798.0, dated Mar. 7, 2022, pp. 1-5.

\* cited by examiner

SOLID-STATE IMAGING DEVICE, METHOD FOR DRIVING SOLID-STATE IMAGING DEVICE, AND ELECTRONIC APPARATUS

RELATED PATENT APPLICATIONS

This application is based on and claims the benefit of priority from International Application No. PCT/JP2018/017623, filed on May 7, 2018, which claims priority to Japanese Patent Application No. 2017-093716, filed on May 10, 2017, the contents of which are hereby incorporated by reference in their entirety.

TECHNICAL FIELD

The present invention relates to a solid-state imaging device, a method for driving a solid-state imaging device, and an electronic apparatus.

BACKGROUND

Solid-state imaging device (image sensors) including photoelectric conversion elements for detecting light and generating charges are embodied as CMOS (complementary metal oxide semiconductor) image sensors, which have been in practical use. The CMOS image sensors have been widely applied as parts of various types of electronic apparatuses such as digital cameras, video cameras, surveillance cameras, medical endoscopes, personal computers (PCs), mobile phones and other portable terminals (mobile devices).

The CMOS image sensor includes, for each pixel, a photodiode (a photoelectric conversion element) and a floating diffusion (FD) amplifier having a floating diffusion (FD). The mainstream design of the reading operation in the CMOS image sensor is a column parallel output processing of selecting one of the rows in the pixel array and reading the pixels in the selected row simultaneously in the column output direction.

Here, the CMOS image sensor may sequentially scan the pixels or rows one-by-one to read the charges generated by photoelectric conversion and stored in the photo-diodes. When such sequential scan is employed, in other words, a rolling shutter is employed as the electronic shutter, it is not possible to start and end the exposure for storing the charges produced by photoelectric conversion at the same time in all of the pixels. Therefore, the sequential scan has such a problem that, when a moving object is imaged, a captured image may experience distortion.

To address this problem, a global shutter is employed as the electronic shutter in a case where image distortion is not acceptable, for example, for the purposes of imaging a fast-moving object and sensing that requires simultaneity among the captured images. When the global shutter is employed, the exposure can be started and ended at the same timing in all of the pixels of the pixel array part.

In a CMOS image sensor employing a global shutter as the electronic shutter, a pixel has therein a signal retaining part for retaining, in a sample-and-hold capacitor, a signal that is read out from a photoelectric conversion reading part, for example. The CMOS image sensor employing a global shutter stores the charges from the photodiodes in the sample-and-hold capacitors of the signal retaining parts at the same time in the form of voltage signals and subsequently sequentially read the voltage signals. In this way, the simultaneity is reliably achieved among the images (see, for example, Non-patent Literature 1).

Furthermore, the stacked CMOS image sensor disclosed in Non-patent Literature 1 has a stacked structure in which a first substrate (a pixel die) and a second substrate (an ASIC die) are connected through micropumps (connecting parts). The first substrate has photoelectric conversion reading parts for individual pixels formed therein, and the second substrate has signal retaining parts for the individual pixels, signal lines, a vertical scanning circuit, a horizontal scanning circuit, a column reading circuit and the like formed therein.

RELEVANT REFERENCES

List of Relevant Non-Patent Literature

[Non-patent Literature 1] J. Aoki, et al., "A Rolling-Shutter Distortion-Free 3D Stacked Image Sensor with −160 dB Parasitic Light Sensitivity In-Pixel Storage Node" ISSCC 2013/SESSION 27/IMAGE SENSORS/27.3.

[Non-patent Literature 2] "A 3D stacked CMOS image sensor with 16 Mpixel global-shutter mode using 4 million interconnections", Toru Kondo, Yoshiaki Takemoto, Kenji Kobayashi, Mitsuhiro Tsukimura, Naohiro Takazawa, Hideki Kato, Shunsuke Suzuki, Jun Aoki, Haruhisa Saito, Yuichi Gomi, Seisuke Matsuda, and Yoshitaka Tadaki.

[Non-patent Literature 3] "A CMOS Active Pixel Image Sensor with In-pixel CDS for High-Speed Cameras", Toru INOUE and Shinji TAKEUCHI, Shoji KAWAHITO, Proc. SPIE 5301, Sensors and Camera Systems for Scientific, Industrial, and Digital Photography Applications V, 250 (Jun. 7, 2004)

SUMMARY

A voltage-mode global shutter is designed to perform correlated double sampling (CDS) at a location neighboring a photoelectric conversion part and thus capable of realizing high shutter efficiency (SRR) or low parasitic light sensitivity (PLS) more easily than a conventional charge-mode global shutter. In addition, the chip stacking technique enables the sampling part and the photoelectric converting part to be provided in different dies, which can accomplish complete light blocking.

Accordingly, even if very intense light, for example, sun light enters, the PLS can be lowered to −160 dB, which hardly affects the image obtained during the charge integration time. This advantage indicates that the above-described pixel-related techniques are promising to be applied to machine-vision cameras, which requires stable images to be acquired even with extreme fluctuation in lighting such as ITS.

In a stacked global-shutter CMOS image sensor, sampling circuits are mounted immediately below the pixels that include photoelectric converting parts. To sample voltage, a large capacitance and a switching transistor are required. A transistor for outputting the sampled voltage is also required. The sampling generates noise voltage, which is inversely proportional to the square root of the sampling capacitance. To achieve reduced noise, it is essentially necessary to implement as large a sampling capacitance as possible.

A plurality of types of devices, including a MOS capacitor, a MIM capacitor, a PIP capacitor, a MOM capacitor and a trench capacitor, are available to implement the sampling capacitance, but it is generally preferable to constitute the sampling part and the output part of the sampling circuit with as few transistors as possible.

Here, as disclosed in Non-patent Literature 3, there are two different ways to perform CDS. The first way uses the AC coupling technique to process the difference between the pixel reset voltage and the optical signal voltage in the sampling circuit and save the result. The AC coupling technique, which is mentioned in the Non-patent Literature 3, can be implemented using an output part having the same configuration as in the conventional 4T-APS pixel and thus requires a reduced number of transistors. Due to the effects of the charge sharing, however, the transfer function gain of the sampling circuit may fall below 0.5 or be approximately 0.8 when different configurations are employed depending on the parasitic capacitance. This disadvantageously increases the input conversion noise very much.

The second way uses the double sampling technique. According to the double sampling, the difference processing is performed in the column circuit. This necessitates an output part in each sampling capacitor as disclosed in Non-patent Literature 2 and thus tends to increase the number of transistors. Nevertheless, no charge sharing occurs, and no signal amplitude loss thus occurs in the sampling circuit. When compared with the AC coupling technique, the pixel sensitivity can be maintained at a relatively higher level and the input conversion noise can be reduced.

The objective of the present invention is to provide a solid-state imaging device, a method for driving a solid-state imaging device and an electronic apparatus that are capable of achieving the reduced increase in number of transistors, preventing the occurrence of signal amplitude loss in the sampling parts, maintaining high pixel sensitivity and reducing input conversion noise.

A first aspect of the present invention provides a solid-state imaging device including a pixel part having a pixel arranged therein, where the pixel includes a photoelectric conversion reading part and a signal retaining part, a reading part for reading a pixel signal from the pixel part, and a signal line to which a retained signal is output from the signal retaining part. The pixel signal read from the pixel at least includes a pixel signal including a read-out signal and a read-out reset signal read from the pixel. The photoelectric conversion reading part of the pixel at least includes an output node, a photoelectric conversion element for storing therein, in a storage period, charges generated by photoelectric conversion, a transfer element for transferring, in a transfer period, the charges stored in the photoelectric conversion element, a floating diffusion to which the charges stored in the photoelectric conversion element are transferred through the transfer element, a first source follower element for converting the charges in the floating diffusion into a voltage signal at a level corresponding to the quantity of the charges and outputting the voltage signal to the output node, and a reset element for resetting, in a reset period, the floating diffusion to a predetermined potential. The signal retaining part includes an input node, a retaining node, a first sampling part including a first sample-and-hold capacitor and a first switch element, where the first sample-and-hold capacitor is for retaining the read-out signal output from the output node of the photoelectric conversion reading part of the pixel and input into the input node, and the first switch element is for selectively connecting the first sample-and-hold capacitor to the retaining node, a second sampling part including a second sample-and-hold capacitor and a second switch element, where the second sample-and-hold capacitor is for retaining the read-out reset signal output from the output node of the photoelectric conversion reading part of the pixel and input into the input node, and the second switch element is for selectively connecting the second sample-and-hold capacitor to the retaining node, and an output part including a second source follower element for outputting, from a source terminal thereof to the signal line, a signal retained in the first sample-and-hold capacitor and a signal retained in the second sample-and-hold capacitor at a level corresponding to a voltage retained in the retaining node.

A second aspect of the present invention provides a method for driving a solid-state imaging device. The solid-state imaging device includes a pixel part having a pixel arranged therein, where the pixel includes a photoelectric conversion reading part and a signal retaining part, a reading part for reading a pixel signal from the pixel part, and a signal line to which a retained signal is output from the signal retaining part. The pixel signal read from the pixel at least includes a pixel signal including a read-out signal and a read-out reset signal read from the pixel. The photoelectric conversion reading part of the pixel at least includes an output node, a photoelectric conversion element for storing therein, in a storage period, charges generated by photoelectric conversion, a transfer element for transferring, in a transfer period, the charges stored in the photoelectric conversion element, a floating diffusion to which the charges stored in the photoelectric conversion element are transferred through the transfer element, a first source follower element for converting the charges in the floating diffusion into a voltage signal at a level corresponding to the quantity of the charges and outputting the voltage signal to the output node, and a reset element for resetting, in a reset period, the floating diffusion to a predetermined potential. The signal retaining part includes an input node, a retaining node, a first sampling part including a first sample-and-hold capacitor and a first switch element, where the first sample-and-hold capacitor is for retaining the read-out signal output from the output node of the photoelectric conversion reading part of the pixel and input into the input node, and the first switch element is for selectively connecting the first sample-and-hold capacitor to the retaining node, a second sampling part including a second sample-and-hold capacitor and a second switch element, where the second sample-and-hold capacitor is for retaining the read-out reset signal output from the output node of the photoelectric conversion reading part of the pixel and input into the input node, and the second switch element is for selectively connecting the second sample-and-hold capacitor to the retaining node, and an output part including a second source follower element for outputting, from a source terminal thereof to the signal line, a signal retained in the first sample-and-hold capacitor and a signal retained in the second sample-and-hold capacitor at a level corresponding to a voltage retained in the retaining node. The solid-state imaging device further includes a power supply switching part for selectively connecting a drain of the second source follower element of the signal retaining part to one of a power supply potential and a reference potential and a node potential switching part for selectively setting the retaining node of the signal retaining part to one of a predetermined voltage level and the reference potential.

According to the second aspect of the present invention, when, in the signal retaining part, the input node and the retaining node are connected to each other, and the first switch element of the first sampling part and the second switch element of the second sampling part are connected in parallel to the retaining node, during a sampling period in which the pixel signal is read from the pixel, the power supply switching part keeps the drain of the second source follower element connected to the reference potential, during a first clear period within the sampling period, the node potential switching part keeps the retaining node set to the reference potential, and the first switch element of the first sampling part of the signal retaining part and the second switch element of the second sampling part are kept in a conduction state so that the first sample-and-hold capacitor of the first sampling part of the signal retaining part and the second sample-and-hold capacitor of the second sampling part are cleared, in a reset signal reading period, in which the read-out reset signal is read as the pixel signal from the pixel, following the first clear period, the second switch element of the second sampling part is kept in a conduction state for a predetermined period of time so that the read-out reset signal is retained in the second sample-and-hold capacitor, during a second clear period following the reset signal reading period, the node potential switching part keeps the retaining node set to the reference potential, and the first switch element of the first sampling part of the signal retaining part is kept in a conduction state so that the first sample-and-hold capacitor of the first sampling part of the signal retaining part is cleared, and in a signal reading period, in which the read-out signal is read as the pixel signal from the pixel, following the second clear period, the first switch element of the first sampling part is kept in a conduction state for a predetermined period of time so that the read-out signal is retained in the first sample-and-hold capacitor.

According to the second aspect of the present invention, when, in the signal retaining part, the first sampling part is connected between the input node and the retaining node, the second switch element of the second sampling part is connected to the retaining node, and the first sample-and-hold capacitor of the first sampling part is connected to the input node, and the first switch element is connected between (i) a connecting node between the first sample-and-hold capacitor and the input node and (ii) the retaining node, during a sampling period in which the pixel signal is read from the pixel, the power supply switching part keeps the drain of the second source follower element connected to the reference potential, during a first clear period within the sampling period, the node potential switching part keeps the retaining node set to the reference potential, and the first switch element of the first sampling part of the signal retaining part and the second switch element of the second sampling part are kept in a conduction state so that the first sample-and-hold capacitor of the first sampling part of the signal retaining part and the second sample-and-hold capacitor of the second sampling part are cleared, in a reset signal reading period, in which the read-out reset signal is read as the pixel signal from the pixel, following the first clear period, while the first switch element of the first sampling part is kept in a conduction state, the second switch element of the second sampling part is kept in a conduction state for a predetermined period of time so that the read-out reset signal is retained in the second sample-and-hold capacitor, during a second clear period following the reset signal reading period, while the second switch element of the second sampling part is kept in a non-conduction state, the node potential switching part keeps the retaining node set to the reference potential, and the first switch element of the first sampling part of the signal retaining part is kept in a conduction state so that the first sample-and-hold capacitor of the first sampling part of the signal retaining part is cleared, and during a signal reading period, in which the read-out signal is read as the pixel signal from the pixel, following the second clear period, the first switch element of the first sampling part is kept in a conduction state for a predetermined period of time so that the read-out signal is retained in the first sample-and-hold capacitor.

A third aspect of the present invention provides an electronic apparatus including a solid-state imaging device, and an optical system for forming a subject image on the solid-state imaging device. The solid-state imaging device includes a pixel part having a pixel arranged therein, where the pixel includes a photoelectric conversion reading part and a signal retaining part, a reading part for reading a pixel signal from the pixel part, and a signal line to which a retained signal is output from the signal retaining part. The pixel signal read from the pixel at least includes a pixel signal including a read-out signal and a read-out reset signal read from the pixel. The photoelectric conversion reading part of the pixel at least includes an output node, a photoelectric conversion element for storing therein, in a storage period, charges generated by photoelectric conversion, a transfer element for transferring, in a transfer period, the charges stored in the photoelectric conversion element, a floating diffusion to which the charges stored in the photoelectric conversion element are transferred through the transfer element; a first source follower element for converting the charges in the floating diffusion into a voltage signal at a level corresponding to the quantity of the charges and outputting the voltage signal to the output node, and a reset element for resetting, in a reset period, the floating diffusion to a predetermined potential. The signal retaining part includes an input node, an retaining node, a first sampling part including a first sample-and-hold capacitor and a first switch element, where the first sample-and-hold capacitor is for retaining the read-out signal output from the output node of the photoelectric conversion reading part of the pixel and input into the input node, and the first switch element is for selectively connecting the first sample-and-hold capacitor to the retaining node, a second sampling part including a second sample-and-hold capacitor and a second switch element, where the second sample-and-hold capacitor is for retaining the read-out reset signal output from the output node of the photoelectric conversion reading part of the pixel and input into the input node, and the second switch element is for selectively connecting the second sample-and-hold capacitor to the retaining node, and an output part including a second source follower element for outputting, from a source terminal thereof to the signal line, a signal retained in the first sample-and-hold capacitor and a signal retained in the second sample-and-hold capacitor at a level corresponding to a voltage retained at the retaining node.

Advantages

The present invention can achieve the reduced increase in number of transistors, prevent the occurrence of signal amplitude loss in the sampling parts, maintain high pixel sensitivity and reduce input conversion noise.

LIST OF REFERENCE NUMBERS 10, 10A, 10B . . . solid-state imaging device,
20, 20A, 20B . . . pixel part,
PD21 . . . photodiode,
TG1-Tr . . . transfer transistor,
RST1-Tr . . . reset transistor,
SF1-Tr . . . source follower transistor,
FD21 . . . floating diffusion,
21 . . . pixel,
211 . . . photoelectric conversion reading part,
212, 212A, 212B . . . signal retaining part,
ND21 . . . output node,
ND22 . . . input node,
2121 . . . input part,
2122 . . . first sampling part,
2123 . . . second sampling part,
2124 . . . output part,
ND23 . . . retaining node,
CS21 . . . first sample-and-hold capacitor,
CR21 . . . second sample-and-hold capacitor,
SHS1-Tr . . . first sampling transistor,
SHR1-Tr . . . second sampling transistor,
30 . . . vertical scanning circuit
40 . . . reading circuit (column reading circuit),
50 . . . horizontal scanning circuit,
60 . . . timing control circuit,
70 . . . reading part,
300 . . . electronic apparatus,
310 . . . CMOS image sensor,
320 . . . optical system,
330 . . . signal processing circuit (PRC)

DESCRIPTION OF THE EMBODIMENTS

Embodiments of the present invention will be hereinafter described with reference to the drawings.

First Embodiment

Figure 1:
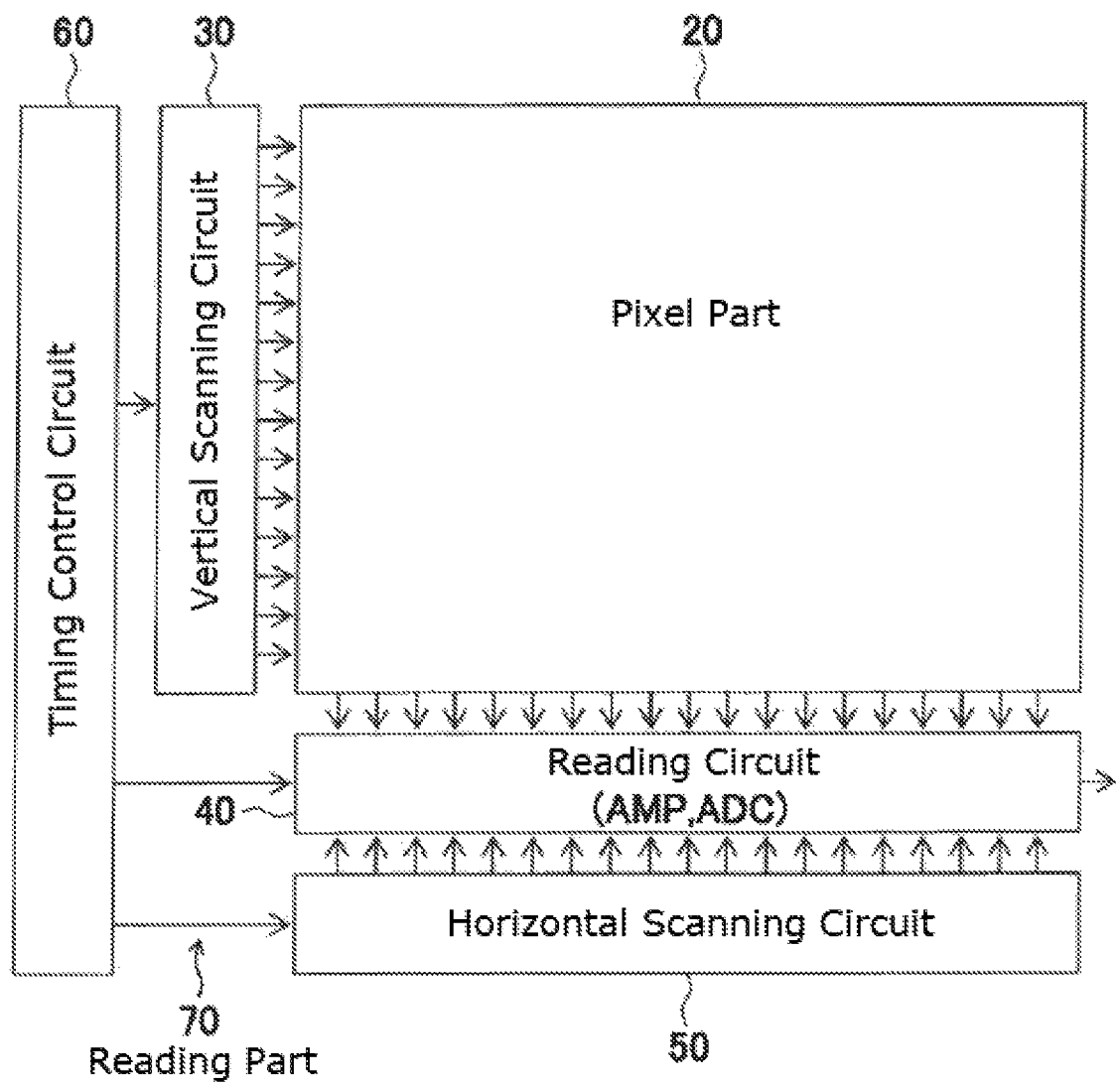
FIG. 1 is a block diagram showing an example configuration of a solid-state imaging device relating to a first embodiment of the present invention.

FIG. 1 is a block diagram showing an example configuration of a solid-state imaging device according to a first embodiment of the present invention. In this embodiment, the solid-state imaging device 10 is constituted by, for example, a CMOS image sensor.

As shown in FIG. 1, the solid-state imaging device 10 is constituted mainly by a pixel part 20 serving as an image capturing part, a vertical scanning circuit (a row scanning circuit) 30, a reading circuit (a column reading circuit) 40, a horizontal scanning circuit (a column scanning circuit) 50, and a timing control circuit 60. Among these components, for example, the vertical scanning circuit 30, the reading circuit 40, the horizontal scanning circuit 50, and the timing control circuit 60 constitute the reading part 70 for reading out pixel signals.

In the solid-state imaging device 10 relating to the first embodiment, the pixel part 20 includes pixels, and each pixel includes a photoelectric conversion reading part and a signal retaining part. The solid-state imaging device 10 is configured, for example, as a stacked CMOS image sensor capable of operating in a global shutter mode. In the first embodiment, the solid-state imaging device 10 is a stacked CMOS image sensor formed by a first substrate and a second substrate, as will be described below in detail. The signal retaining part formed in the second substrate is provided with a first sampling part and a second sampling part, each of which is formed by one sampling transistor (1T) and one sampling capacitor (1C). The coupling node between the two sampling parts serves as a retaining node and is used as a bidirectional port. With such a configuration, the solid-state imaging device 10 is configured as a solid-state imaging element having a global shutter function that achieves a substantially the same signal amplitude as in the differential reading scheme with four transistors.

The following outlines the configurations and functions of the parts of the solid-state imaging device 10. In particular, the configurations and functions of the pixel part 20 and the relating reading operation will be described in detail, and the stacked structure of the pixel part 20 and the reading part 70 and other features will be also described in detail.

(The Configurations of the Pixel and the Pixel Part 20)

Figure 2:
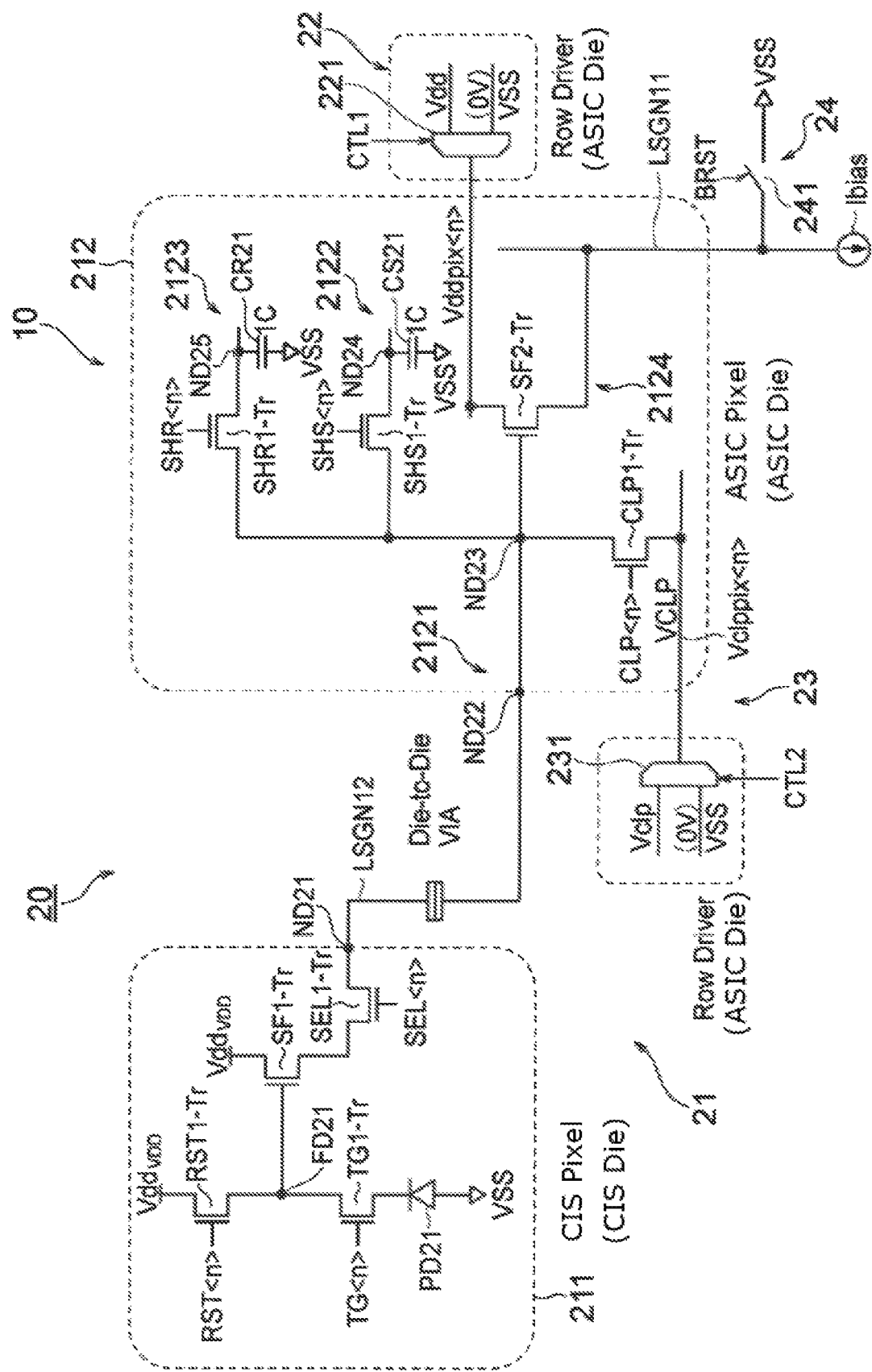
FIG. 2 is a circuit diagram showing an example configuration of a pixel of the solid-state imaging device relating to the first embodiment of the present invention.

FIG. 2 is a circuit diagram showing an example configuration of the pixel of the solid-state imaging device 10 relating to the first embodiment of the present invention.

The pixel 21 arranged in the pixel part 20 includes a photoelectric conversion reading part 211 and a signal retaining part 212. In the pixel part 20 of the first embodiment, a power supply switching part 22, a node potential switching part 23 and a bus resetting part 24 are arranged in correspondence with the pixel 21 or a plurality of pixels 21.

The photoelectric conversion reading part 211 of the pixel 21 includes a photodiode (a photoelectric conversion element) and an in-pixel amplifier. More specifically, the photoelectric conversion reading part 211 includes, for example, a photodiode PD21 serving as a photoelectric conversion reading part. For the photodiode PD21, one transfer transistor TG1-Tr serving as a transferring element, one reset transistor RST1-Tr serving as a resetting element, one source follower transistor SF1-Tr serving as a first source follower element, one selection transistor SEL1-Tr serving as a selecting element and one output node ND21 are provided. As described above, the photoelectric conversion reading part 211 of the pixel 21 relating to the first embodiment includes four transistors (4Tr), namely, the transfer transistor TG1-Tr, the reset transistor RST1-Tr, the first source follower transistor SF1-Tr, and the selection transistor SEL1-Tr.

The photoelectric conversion reading part 211 relating to the first embodiment has the output node ND21 connected to the input part of the signal retaining part 212 of the pixel 21. The photoelectric conversion reading part 211 outputs to the signal retaining part 212 a read-out signal (signal voltage) (VSIG) and a read-out reset signal (signal voltage) (VRST), as a pixel signal, in the global shutter mode.

In the first embodiment, the vertical signal line LSGN11 is driven by a constant current source Ibias in the global shutter mode.

The photodiode PD21 generates signal charges (electrons) in an amount determined by the quantity of the incident light and stores the same. Description will be hereinafter given of a case where the signal charges are electrons and each transistor is an n-type transistor. However, it is also possible that the signal charges are holes or each transistor is a p-type transistor. Further, this embodiment is also applicable to the case where a plurality of photodiodes and transfer transistors share the transistors or the case where the pixel includes three transistors (3Tr) other than the selection transistor.

The transfer transistor TG1-Tr of the photoelectric conversion reading part 211 is connected between the photodiode PD21 and the floating diffusion FD21 and controlled by a control signal TG applied to the gate thereof through a control line. The transfer transistor TG1-Tr remains selected and in the conduction state during a transfer period in which the control signal TG is at the high (H) level, to transfer to the floating diffusion FD21 the charges (electrons) produced by the photoelectric conversion and then stored in the photodiode PD21.

The reset transistor RST1-Tr is connected between a power supply line Vdd of power supply voltage VDD and the floating diffusion FD21 and controlled by a control signal RST applied to the gate thereof through a control line. The reset transistor RST1-Tr remains selected and in the conduction state during a reset period in which the control signal RST is at the H level, to reset the floating diffusion FD21 to the potential of the power supply line Vdd of the power supply voltage VDD.

The source follower transistor SF1-Tr, serving as a first source follower element, and the selection transistor SEL1-Tr are connected in series between the power supply line Vdd and the output node ND21. A signal line LSGN12 between the output node ND21 and the input part of the signal retaining part 212 is driven by a capacitor or constant current source, which is, for example, arranged in the signal retaining part 212.

The gate of the source follower transistor SF1-Tr is connected to the floating diffusion FD21, and the selection transistor SEL1-Tr is controlled by the control signal SEL applied to the gate thereof through a control line. The selection transistor SEL1-Tr remains selected and in the conduction state during a selection period in which the control signal SEL is at the H level. In this way, the source follower transistor SF1-Tr outputs, through the output node ND21 to the signal line LSGN12, a read-out signal (VSIG) and a read-out reset signal (VRST) of a column output obtained by converting the charges in the floating diffusion FD21 into a voltage signal determined by the quantity of the charges (potential).

The signal retaining part 212 of the pixel 21 basically includes an input part 2121 including the input node ND22, a first sampling part 2122, a second sampling part 2123, an output part 2124 and a retaining node ND23.

In the signal retaining part 212 relating to the first embodiment, the input node ND22 and the retaining node ND23 are directly connected. To the retaining node ND23, the first switch element of the first sampling part 2122 and the second switch element of the second sampling part 2123 are connected in parallel.

The input part 2121 has the input node ND22 connected to the output node ND21 of the photoelectric conversion reading part 211 through the signal line LSGN12 and inputs the read-out signal (VSIG) and the read-out reset signal (VRST), which are output from the output node ND21, into the first sampling part 2122 and the second sampling part 2123 through the retaining node ND23.

The first sampling part 2122 includes a first sample-and-hold capacitor CS21 and a first sampling transistor SHS1-Tr. The first sample-and-hold capacitor CS21 is capable of retaining the read-out signal VSIG output from the output node ND21 of the photoelectric conversion reading part 211 and input into the input node ND22. The first sampling transistor SHS1-Tr serves as a first switch element that is configured to selectively connect the first sample-and-hold capacitor CS21 to the retaining node ND23.

The first sample-and-hold capacitor CS21 is connected between the node ND24 and the reference potential VSS. The first sampling transistor SHS1-Tr is connected between the retaining node ND23 and the node ND24. The first sampling transistor SHS1-Tr is in the conduction state during a period in which, for example, the control signal SHS is at the high level. The first sampling transistor SHS1-Tr keeps the first sample-and-hold capacitor CS21 of the first sample holding part 2122 selectively connected to the retaining node ND23 during a global shutter period or sample-and-hold capacitor clear period.

The second sampling part 2123 includes a second sample-and-hold capacitor CR21 and a second sampling transistor SHR1-Tr. The second sample-and-hold capacitor CR21 is capable of retaining the read-out reset signal VRST output from the output node ND21 of the photoelectric conversion reading part 211 and input into the input node ND22. The second sampling transistor SHR1-Tr serves as a second switch element that is configured to selectively connect the second sample-and-hold capacitor CR21 to the retaining node ND23.

The second sample-and-hold capacitor CR21 is connected between the node ND25 and the reference potential VSS. The second sampling transistor SHR1-Tr is connected between the retaining node ND23 and the node ND25. The second sampling transistor SHR1-Tr is in the conduction state during a period in which, for example, the control signal SHR is at the high level. The second sampling transistor SHR1-Tr keeps the second sample-and-hold capacitor CR21 of the second sample holding part 2123 selectively connected to the retaining node ND23 during a global shutter period or sample-and-hold capacitor clear period.

The reading of the signal from the photoelectric conversion reading part 211 to the signal retaining part 212 is carried out by connecting the first sample-and-hold capacitor CS21 and the second sample-and-hold capacitor CR21, which are 0V-cleared sampling capacitors, to the retaining node ND23.

As seen from above, in the signal retaining part 212 relating to the first embodiment, the first sampling part 2122 and the second sampling part 2123 have a one-transistor (1T) and one-capacitor (1C) configuration as in DRAM, so that charges can be bidirectionally transferred between the first and second sampling parts 2122 and 2123 and the retaining node ND23. In other words, in the signal retaining part 212 relating to the first embodiment, both writing (sampling) and reading (charge sharing) are performed to a single point, which can achieve the reduced number of necessary transistors.

The first sampling transistor SHS1-Tr and the second sampling transistor SHR1-Tr are formed by a MOS transistor, for example, an n-channel MOS (NMOS) transistor. The first sample-and-hold capacitor CS21 and the second sample-and-hold capacitor CR21 are formed by one of a MOS capacitor, a MIM capacitor, a PIP capacitor and a MOM capacitor, or a combination thereof.

The output part 2124 includes a source follower transistor SF2-Tr serving as a second source follower element for outputting, from the source terminal thereof, the read-out signal VISG retained in the first sample-and-hold capacitor CS21 of the first sampling part 2122 and the read-out reset signal VRST retained in the second sample-and-hold capacitor CR21 of the second sampling part 2123 at a level corresponding to the voltage retained at the retaining node ND to the vertical signal line LSGN11.

The source follower transistor SF2-Tr serving as the second source follower element is connected at the source terminal thereof to the vertical signal line LSGN11, at the drain terminal thereof to the power supply switching part 22 via the power supply line Vddpix, and at the gate terminal thereof to the retaining node ND23.

The source follower transistor SF2-Tr remains connected at the drain thereof to the power supply line Vddpix at the power supply potential VDD by the power supply switching part 22 during a retained signal reading period PHRD, in which the read-out signal VSIG and the read-out reset signal VRST retained in the first sample-and-hold capacitor CS21 and the second sample-and-hold capacitor CR21 are read out. In this case, the source follower transistor SF2-Tr outputs the read-out signal (VSIG) and the read-out reset signal (VRST) of a column output, which are obtained by converting the voltage retained in the retaining node ND23 into a corresponding voltage signal, to the vertical signal line LSGN11.

The source follower transistor SF2-Tr remains connected at the drain thereof to the reference potential VSS (for example, the ground level or 0V) by the power supply switching part 22 during a clear period PCL in which the first sample-and-hold capacitor CS21 and the second sample-and-hold capacitor CR21 of the signal retaining part 212 are cleared and during a sampling period PSML in which the read-out signal and the read-out reset signal read from the photoelectric conversion reading part 211 are written into (retained in) the first sample-and-hold capacitor CS21 and the second sample-and-hold capacitor CR21.

In the power supply switching part 22, the output from the selecting part 221 is connected to the power supply line Vddpix connected to the drain of the source follower transistor SF2-Tr of the output part 2124 of the signal retaining part 212, and the selecting part 221 connects the power supply line Vddpix to the power supply line Vdd at the power supply potential VDD (for example, 3V) or the reference potential VSS, according to the control signal CTL1. For example, the control signal CTL1 is set to the L level during the clear period PCL or sampling period PSML, so that the selecting part 221 of the power supply switching part 22 connects the power supply line Vddpix to the reference potential VSS. On the other hand, the control signal CTL1 is set to the H level during the retained signal reading period PHRD, so that the selecting part 221 of the power supply switching part 22 connects the power supply line Vddpix to the power supply line Vdd at the power supply potential VDD.

The source terminal of the source follower transistor SF2-Tr is connected to the vertical signal line LSGN11, as described above, which is connected to the bus resetting part 24. The bus resetting part 24 includes a switch element 241 connected between the vertical signal line LSGN11 and the reference potential VSS. The switch element 241 is turned on or off by the bus reset signal BRST.

The source terminal of the source follower transistor SF2-Tr serves as an impedance during the retained signal reading period PHRD as it is driven by a constant current, but is fixed at the reference potential VSS (for example, 0V) during the sampling period PSML, since the bus reset signal BRST for the switch element 241 of the bus resetting part 24 is set to turn on the switch element 241. As a result, the source follower transistor SF2-Tr enters the strong inversion region and becomes equivalent to a MOS capacitor. This resultantly imposes band limit on the transistors preceding this MOS capacitor and can thereby reduce the noise.

In the signal retaining part 212, the retaining node ND23 is connected to the node potential switching part 23, which serves as a clamp circuit. The node potential switching part 23 is configured to be capable of selectively setting the retaining node ND23 of the signal retaining part 212 to one of a predetermined voltage level VCLP and the reference potential VSS (for example, 0V), which allows the output part 2124 of the signal retaining part 212 to realize CDS reading.

The node potential switching part 23 serving as a clamp circuit includes a selecting part 231 and a switching transistor CLP1-Tr. The selecting part 231 is capable of selecting one of the predetermined voltage VCLP (for example, 2.6V) and the reference potential VSS as a clamp voltage according to the control signal CTL2, and the switching transistor CLP1-Tr is capable of selectively connecting the output line of the selecting part 231 to the retaining node ND23.

Referring to the node potential switching part 23, the selecting part 231 is connected to the power supply line Vclppix connected to the source terminal of the switching transistor CLP1-Tr, and the selecting part 231 connects the power supply line Vclppix to one of the power supply line Vclp at the predetermined voltage VCLP (for example, 2.6V) and the reference potential VSS, according to the control signal CTL2. For example, the control signal CTL2 is set to the L level during the clear period PCL or sampling period PSML, so that the selecting part 231 of the node potential switching part 23 connects the power supply line Vclppix to the reference potential VSS. On the other hand, the control signal CTL2 is set to the H level during the retained signal reading period PHRD, so that the selecting part 231 of the node potential switching part 23 connects the power supply line Vclppix to the power supply line Vclp at the predetermined voltage VCLP.

The switching transistor CLP1-Tr of the node potential switching part 23 is turned on or off by the control signal CLP. The switching transistor CLP1-Tr remains on while the control signal CLP remains at the H level, so that the retaining node is connected to the power supply line Vclppix connected to the source terminal and the retaining node ND23 is set to the predetermined voltage VCLP (for example, 2.6V) or reference potential VSS. In other words, the switching transistor CLP1-Tr of the node potential switching part 23 relating to the first embodiment serves as a switch element.

The node potential switching part 23 sets the retaining node ND23 to the predetermined voltage VCLP during the retained signal reading period PHRD, so that the predetermined voltage VCLP is used as the initial voltage for the CDS reading performed by the output part 2124 of the signal retaining part 212. Furthermore, the node potential switching part 23 keeps the retaining node ND23 fixed at the reference potential VSS (for example, 0V) while reading is performed on other rows, so that the source follower transistor SF2-Tr of the output part 2124 can operate as an off switch.

As described above, in the solid-state imaging device 10 relating to the first embodiment, in the voltage mode, the pixel signal is sampled into the signal retaining part 212 serving as a pixel signal storage, which takes place in all of the pixels at the same time, and the signals obtained by converting the read-out signals retained in the first sample-and-hold capacitor CS21 and the second sample-and-hold capacitor CR21 are read out to the vertical signal line LSGN11 and fed to the column reading circuit 40.

In the solid-state imaging device 10 relating to the first embodiment, the constant current source designed to drive the signal line LSGN12 between the output node ND21 of the photoelectric conversion reading part 211 and the input part of the signal retaining part 212 is not arranged in the input part 2121 of the signal retaining part 212, and the signal line LSGN12 is driven by a dynamic current source provided by the first sample-and-hold capacitor CS21 and the second sample-and-hold capacitor CR21.

Both of the first sample-and-hold capacitor CS21 and the second sample-and-hold capacitor CR21 are cleared to and kept at 0V during the clear period, and when the first sample-and-hold capacitor CS21 and the second sample-and-hold capacitor CR21 are connected to the source follower transistor SF1-Tr of the photoelectric conversion reading part 211, the electrons are fed from the first sample-and-hold capacitor CS21 and the second sample-and-hold capacitor CR21. Accordingly, the first sample-and-hold capacitor CS21 and the second sample-and-hold capacitor CR21 serve as a dynamic current source.

Figure 3:
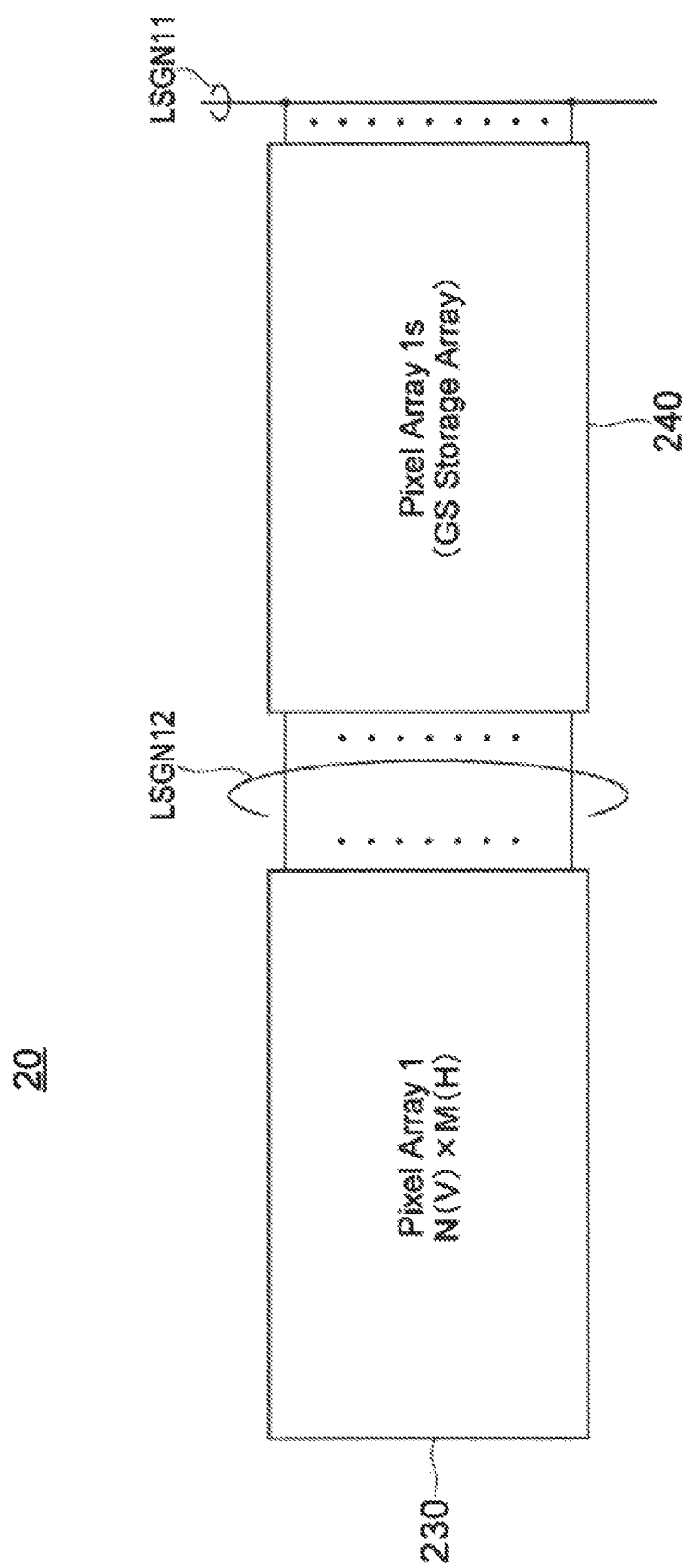
FIG. 3 is used to illustrate a pixel array in a pixel part of the solid-state imaging device relating to the first embodiment of the present invention.

In the pixel part 20 relating to the first embodiment, the pixels 21 each having the above-described configuration are arranged to form a pixel array, for example, as shown in FIG. 3, and a plurality of pixel arrays are combined.

FIG. 3 is used to illustrate the pixel arrays in the pixel part 20 of the solid-state imaging device 10 relating to the first embodiment of the present invention.

The pixel part 20 of the solid-state imaging device 10 relating to the first embodiment includes a pixel array 230 and a retaining part array 240.

In the pixel array 230, photoelectric conversion reading parts 211 of a plurality of pixels 21 are arranged in a two-dimensional matrix of N rows and M columns. In the pixel array 230, the photoelectric conversion reading parts 211 of the plurality of pixels 21 are arranged in a two-dimensional matrix of N rows and M columns, such that an image having an aspect ratio of 16:9 can be output, for example.

In the retaining part array 240, signal retaining parts 212 of the plurality of pixels 21 are arranged in a two-dimensional matrix of N rows and M columns, correspondingly to the pixel array 230. As in the pixel array 230, in the retaining part array 240, the signal retaining parts 212 of the plurality of pixels 21 are arranged in a two-dimensional matrix of N rows and M columns, such that an image having an aspect ratio of 16:9 can be output, for example.

When the solid-state imaging device 10 has a stacked structure made up by a first substrate (an upper substrate) and a second substrate (a lower substrate) as will be described below, the pixel array 230 is formed in the first substrate, and the retaining part array 240 is formed in the second substrate so as to face the pixel array 230. In this case, the retaining part array 240 may be completely blocked from light with a metal wiring layer.

In the global shutter mode, in the pixel part 20 under the control of the reading part 70, the pixel array 230 and the retaining part array 240 are activated so that the pixel signals are read out.

In the pixel part 20, the reset transistor RST1-Tr and the transfer transistor TG1-Tr are used to reset the photodiode concurrently in all of the pixels, so that exposure to light starts concurrently in parallel in all of the pixels. After the exposure of a predetermined duration ends, the transfer transistor TG1-Tr is used to sample the output signal from the photoelectric conversion reading part 211 in the signal retaining part 212, so that the exposure ends concurrently in parallel in all of the pixels. This successfully accomplish a perfect electronic shutter.

Since the pixel part 20 includes the pixels arranged in N rows and M columns, there are N control lines for each of the control signals SEL, RST and TG, and M vertical signal lines LSGN11. In FIG. 1, the control lines for each row are represented as one row-scanning control line. Similarly, each vertical signal line LSGN11 is represented as one vertical signal line. The second signal line LSGN12 is provided for each pixel between the photoelectric conversion reading part 211 and the signal retaining part 212.

The vertical scanning circuit 30 drives the photoelectric conversion reading parts 211 and the signal retaining parts 212 of the pixels 21 through row-scanning control lines in shutter and reading rows, under the control of the timing control circuit 60. Further, the vertical scanning circuit 30 outputs, according to an address signal, row selection signals indicating the row addresses of the reading row from which signals are to be read out and the shutter row in which the charges stored in the photodiodes PD21 are to be reset.

The column reading circuit 40 includes a plurality of column signal processing circuits (not shown) arranged so as to correspond to the column outputs from the pixel part 20, and the column reading circuit 40 may be configured such that the plurality of column signal processing circuits are capable of processing the columns in parallel. The column reading circuit 40 amplifies and AD converts, in the global shutter mode, the differential pixel signals pixout (VSL) that are read out from the signal retaining parts 212 of the pixels 21 to the vertical signal lines LSGN11.

The pixel signal pixout (VSL) denotes a pixel read-out signal including a read-out signal VSIG and a read-out reset signal VRST that are read in the stated order from the pixel (in the present example, the photoelectric conversion reading part 211 and the signal retaining part 212 of the pixel 21) in the global shutter mode.

In the solid-state imaging device 10 relating to the first embodiment, the column reading circuit 40 is configured such that the single circuit configuration can be used in any operational modes and for read-out signals of any signal types (single-ended or differential read-out signals).

Figure 4:
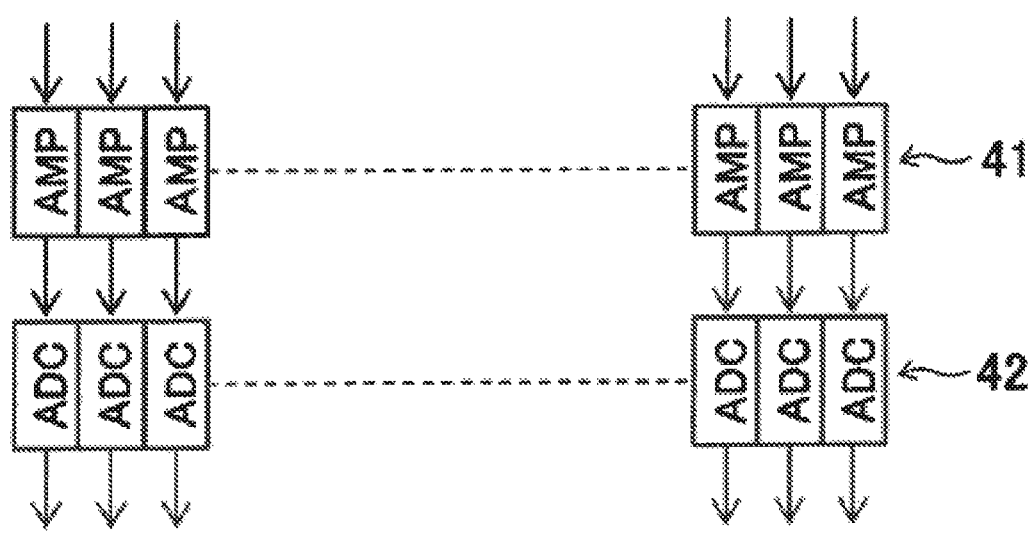
FIG. 4 is used to illustrate an example configuration of a column output reading system in a pixel part of a solid-state imaging device relating to an embodiment of the present invention.

The column reading circuit 40 includes an amplifier (AMP) 41 and an analog-to-digital converter (ADC) 42 as shown in FIG. 4, for example.

The horizontal scanning circuit 50 scans the signals processed in the plurality of column signal processing circuits, for example, ADCs of the column reading circuit 40, transfers the signals in a horizontal direction, and outputs the signals to a signal processing circuit (not shown).

The timing control circuit 60 generates timing signals required for signal processing in the pixel part 20, the vertical scanning circuit 30, the reading circuit 40, the horizontal scanning circuit 50, and the like.

In the first embodiment, the reading part 70 activates the pixel array 230 and the retaining part array 240 to read the differential pixel signal pixout, for example, in the global shutter mode.

(The Stacked Structure of the Solid-State Imaging Device 10)

The following describes the stacked structure of the solid-state imaging device 10 relating to the first embodiment.

Figure 5:
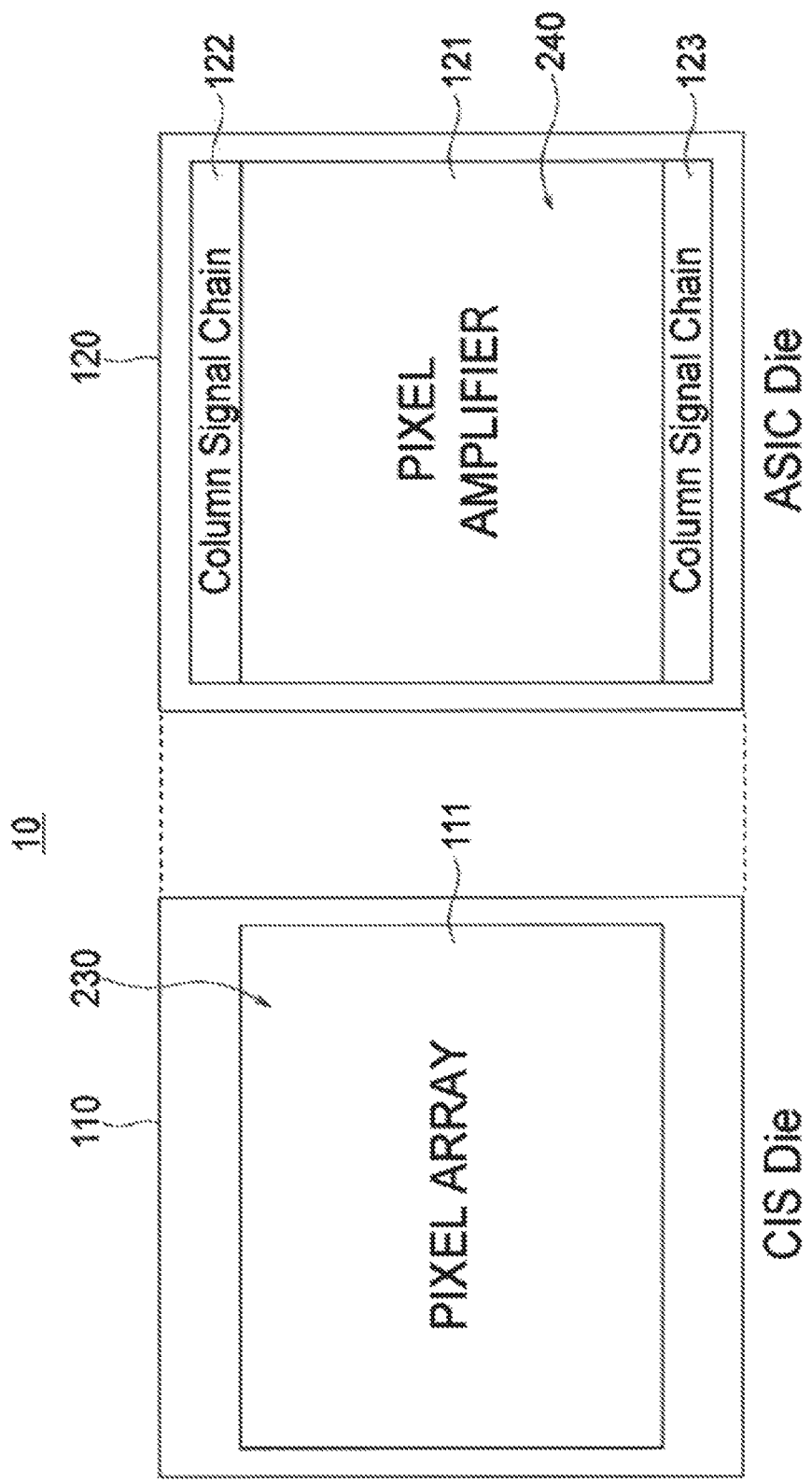
FIG. 5 is used to illustrate a first stacked structure of the solid-state imaging device 10 relating to the first embodiment of the present invention.
Figure 6:
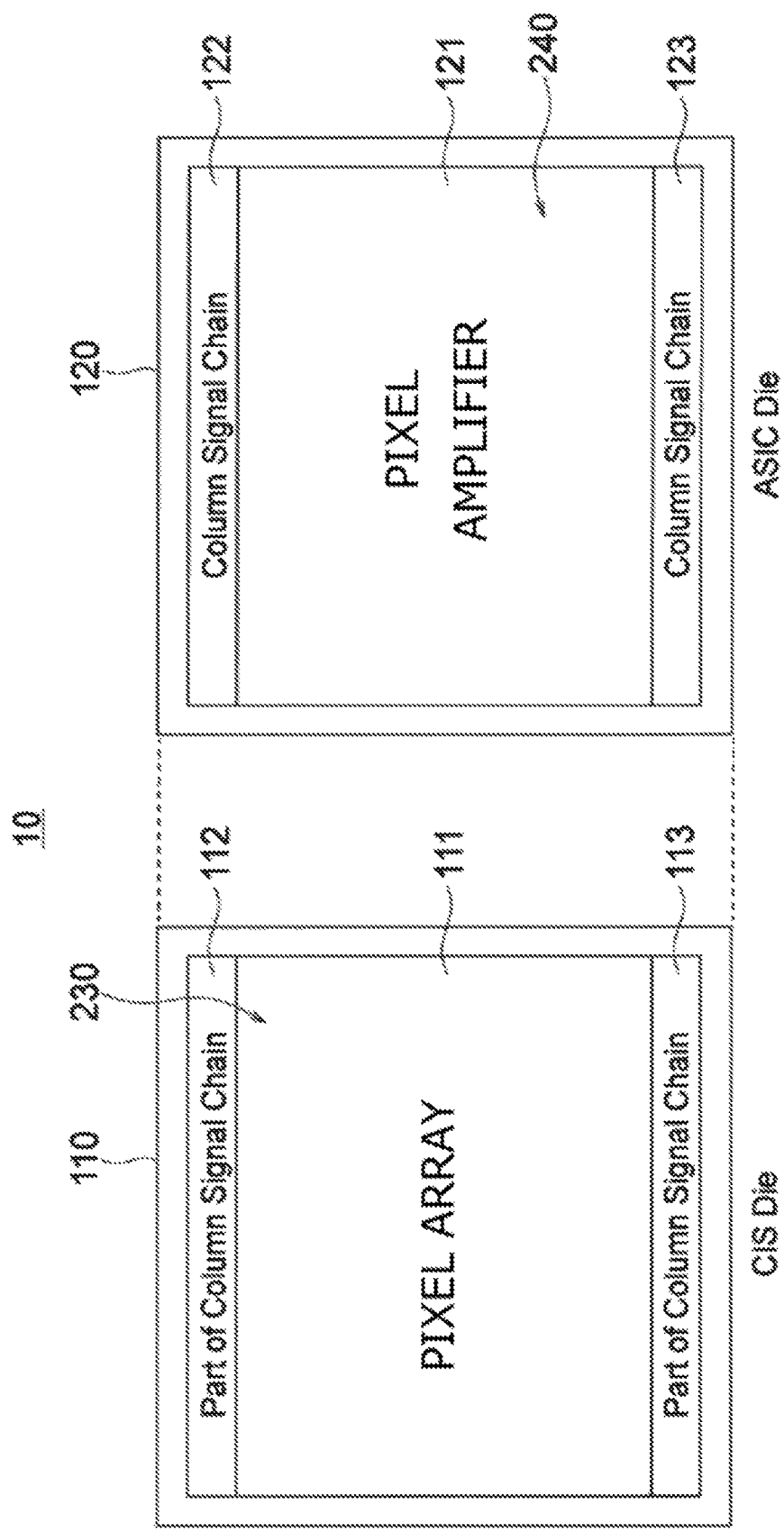
FIG. 6 is used to illustrate a second stacked structure of the solid-state imaging device 10 relating to the first embodiment of the present invention.

FIG. 5 is used to illustrate a first stacked structure of the solid-state imaging device 10 relating to the first embodiment of the present invention. FIG. 6 is used to illustrate a second stacked structure of the solid-state imaging device 10 relating to the first embodiment of the present invention.

The solid-state imaging device 10 relating to the first embodiment has a stacked structure of a first substrate (an upper substrate) 110 and a second substrate (a lower substrate) 120. The solid-state imaging device 10 is formed as an imaging device having a stacked structure that is obtained, for example, by bonding wafers together and subjecting the bonded wafers to dicing. In the present example, the first substrate 110 is stacked on the second substrate 120.

In the first substrate 110, as shown in FIGS. 5 and 6, the pixel array 230 (a region 111) is formed and centered around the central portion of the first substrate 110. In the pixel array 230, the photoelectric conversion reading parts 211 of the pixels 21 of the pixel part 20 are arranged. Around the pixel array 230, specifically speaking, on the upper and lower sides in the example shown in FIG. 6, regions 112, 113 are formed for portions of the column reading circuit 40. The portions of the column reading circuit 40 may be configured such that they can be arranged in one of the regions on the upper and lower sides of the region 111 for the pixel array 230.

As described above, basically in the first embodiment, the photoelectric conversion reading parts 211 of the pixels 21 are arranged in a matrix pattern in the first substrate 110.

In the second substrate 120, the retaining part array 240 (a region 121) is formed and centered around the central portion of the second substrate 120 and the vertical signal line LSGN11 is also formed. In the array 240, the signal retaining parts 212 of the pixels 21, which are connected to the output nodes ND21 of the photoelectric conversion reading parts 211 of the pixel array 230, are arranged in a matrix pattern. The retaining part array 240 may be completely blocked from light with a metal wiring layer. Around the retaining part array 240, or on the upper and lower sides in the examples shown in FIGS. 5 and 6, regions 122, 123 are formed for the column reading circuit 40. The column reading circuit 40 may be configured such that it can be arranged in one of the regions on the upper and lower sides of the region 121 for the retaining part array 240. On the lateral side of the retaining part array 240, a region for the vertical scanning circuit 30 and a region for the digital and output systems may be formed. In the second substrate 120, the vertical scanning circuit 30, the horizontal scanning circuit 50 and the timing control circuit 60 may be also formed.

In the above-described stacked structure, the output nodes ND21 of the photoelectric conversion reading parts 211 of the pixel array 230 in the first substrate 110 are electrically connected to the input nodes ND22 of the signal retaining parts 212 of the pixels 21 in the second substrate 120 through vias (die-to-die vias), microbumps, or the like as shown in FIG. 2, for example.

(Reading Operation of the Solid-State Imaging Device 10)

The above describes the characteristic configurations and functions of the parts of the solid-state imaging device 10. Next, a detailed description will be given of the reading operation of the differential pixel signal in the solid-state-imaging device 10 relating to the first embodiment.

Figure 7:
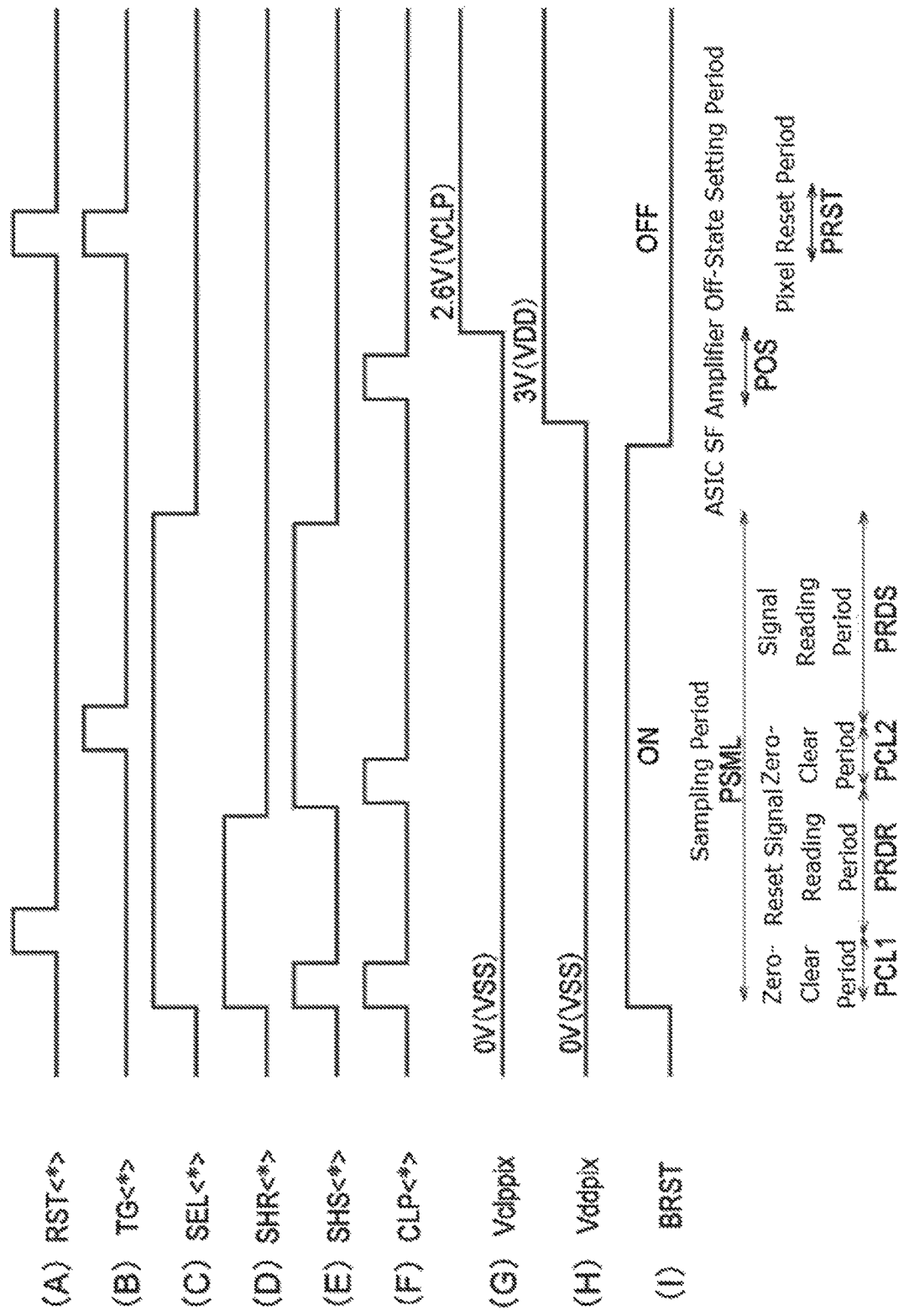
FIG. 7 is a timing chart including parts (A) to (I) to illustrate operations performed in a clear period and a sampling period mainly by a pixel part of the solid-state imaging device relating to the first embodiment of the present invention in a predetermined shutter mode.
Figure 8:
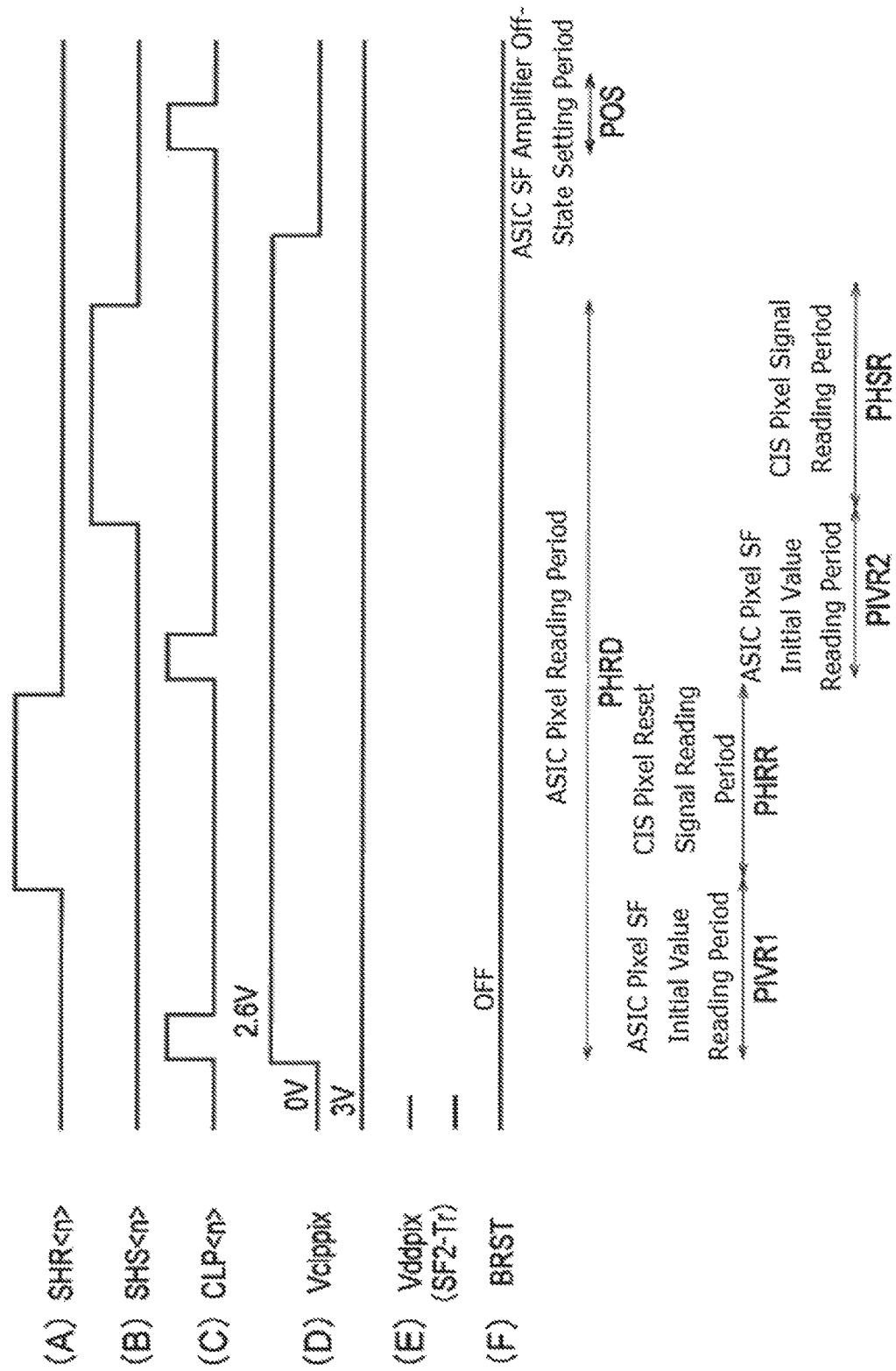
FIG. 8 is a timing chart including parts (A) to (F) to illustrate a reading operation performed in a retained signal reading period mainly by the pixel part of the solid-state imaging device relating to the first embodiment of the present invention in a predetermined shutter mode.

FIG. 7 is a timing chart including parts (A) to (I) to illustrate operations performed in a clear period and a sampling period mainly by the pixel part of the solid-state imaging device relating to the first embodiment of the present invention in a predetermined shutter mode. FIG. 8 is a timing chart including parts (A) to (F) to illustrate a reading operation performed in a retaining signal reading period mainly by the pixel part of the solid-state imaging device relating to the first embodiment of the present invention in a predetermined shutter mode.

In FIG. 7, the part (A) shows the control signal RST for the reset transistor RST1-Tr of the photoelectric conversion reading part 211 of the pixel 21. In FIG. 7, the part (B) shows the control signal TG for the transfer transistor TG1-Tr of the photoelectric conversion reading part 211 of the pixel 21. In FIG. 7, the part (C) shows the control signal SEL for the selection transistor SEL1-Tr of the photoelectric conversion reading part 211 of the pixel 21. In FIG. 7, the part (D) shows the control signal SHR for the second sampling transistor SHR1-Tr of the signal retaining part 212 of the pixel 21. In FIG. 7, the part (E) shows the control signal SHS for the first sampling transistor SHS1-Tr of the signal retaining part 212 of the pixel 21. In FIG. 7, the part (F) shows the control signal CLP for the switching transistor CLP1-Tr of the node potential switching part 23. In FIG. 7, the part (G) shows the level of the power supply line Vclppix of the node potential switching part 23. In FIG. 7, the part (H) shows the level of the power supply line Vddpix of the power supply switching part 22. In FIG. 7, the part (I) shows the bus reset signal BRST for the bus resetting part 24. In FIG. 7, the mark <*> represents that the state in question is the same in all of the rows.

In FIG. 8, the part (A) shows the control signal SHR for the second sampling transistor SHR1-Tr of the signal retaining part 212 of the pixel 21. In FIG. 8, the part (B) shows the control signal SHS for the first sampling transistor SHS1-Tr of the signal retaining part 212 of the pixel 21. In FIG. 8, the part (C) shows the control signal CLP for the switching transistor CLP1-Tr of the node potential switching part 23. In FIG. 8, the part (D) shows the level of the power supply line Vclppix of the node potential switching part 23. In FIG. 8, the part (E) shows the level of the power supply line Vddpix of the power supply switching part 22. In FIG. 8, the part (F) shows the bus reset signal BRST for the bus resetting part 24. In FIG. 8, the mark <n> denotes the row from which the signals are read out to the column reading circuit.

(Sampling Operation)

The following first describes the sampling operation performed during the sampling period PSML, which includes the zero-clear operation performed during the zero-clear period PCL, with reference to FIG. 7 including parts (A) to (I).

During the sampling period PSML, as shown in the part (H) in FIG. 7, the power supply switching part 22 keeps the power supply line Vddpix, which is connected to the drain terminal of the source follower transistor of the output part 2124, remaining at the reference potential VSS (for example, 0V). As shown in the part (G) in FIG. 7, the node potential switching part 23 keeps the power supply line Vclppix at the reference potential VSS (for example, 0V). As shown in the part (I) in FIG. 7, the bus reset signal BRST for the switch element 241 of the bus resetting part 24 turns on the switch element 241, so that the switch element 241 is fixed at the reference potential VSS (for example, 0V). As a result, the source follower transistor SF2-Tr enters the strong inversion region and becomes equivalent to a MOS capacitor. This resultantly imposes band limit on the transistors preceding this MOS capacitor and can thereby reduce the noise. In addition, as shown in the part (C) in FIG. 7, during the sampling period PSML, the selection transistor SEL1-Tr of the photoelectric conversion reading part 211 remains in the conduction state due to the control signal SEL being at the H level.

While these states are maintained, first of all, the first sample-and-hold capacitor CS21 and the second sample-and-hold capacitor CR21 of the signal retaining part 212 are zero-cleared, which takes place in a first zero-clear period PCL1. During the first zero-clear period PCL1, as shown in the part (F) FIG. 7, the control signal CLP remains at the H level for a predetermined period of time, which causes the switching transistor CLP1-Tr of the node potential switching part 23 to remain in the conduction state for the predetermined period of time. This accordingly results in the retaining node ND23 of the signal retaining part 212 remaining at the reference potential VSS (for example, 0V). In parallel with this, as shown in the parts (D) and (E) in FIG. 7, the control signal SHR for the second sampling transistor SHR1-Tr of the signal retaining part 212 and the control signal SHS for the first sampling transistor SHS1-Tr remain at the H level, so that the first sampling transistor SHS1-Tr and the second sampling transistor SHR1-Tr are in the conduction state. This clears, to 0V, the first sample-and-hold capacitor CS21 and the second sample-and-hold capacitor CR21 of the signal retaining part 212.

When both of the first sample-and-hold capacitor CS21 and the second sample-and-hold capacitor CR21 are cleared to 0V in the clear period and connected to the source follower transistor SF1-Tr of the photoelectric conversion reading part 211, the electrons are fed from the first sample-and-hold capacitor CS21 and the second sample-and-hold capacitor CR21. As described above, the first sample-and-hold capacitor CS21 and the second sample-and-hold capacitor CR21 serves as a dynamic current source.

The first zero-clear period PCL1 is followed by a reset signal reading period PRDR in which the read-out reset signal VRST is read as the pixel signal from the photoelectric conversion reading part 211. In the reset signal reading period PRDR, the reset transistor RST1-Tr remains selected and in the conduction state during a period in which the control signal RST is at the H level. In addition, while the control signal RST is kept at the H level, the floating diffusion FD21 is reset to the potential of the power supply line Vdd. In the photoelectric conversion reading part 211, the source follower transistor SF1-Tr converts the charges in the floating diffusion FD21 into a voltage signal at a level determined by the quantity of the charges (the potential)d and outputs the voltage signal from the output node ND21 through the selection transistor SEL1-Tr as the read-out reset signal VRST of a column output. Subsequently, the control signal RST for the reset transistor RST1-Tr is switched to the L level, so that the reset transistor RST1-Tr is brought into the non-conduction state.

In the signal retaining part 212, on the other hand, the control signal SHR still remains at the H level continuously from the first zero-clear period PCL1, for example, so that the second sampling transistor SHR1-Tr remains in the conduction state.

In this way, the read-out reset signal VRST output from the output node ND21 of photoelectric conversion reading part 211 is transmitted to the corresponding signal retaining part 212 through the second signal line LSGN12 and retained in the second sample-and-hold capacitor CR21 through the second sampling transistor SHR1-Tr.

After the read-out reset signal VRST is retained in the second sample-and-hold capacitor CR21, the control signal SHR is switched to the L level, so that the second sampling transistor SHR1-Tr is brought into the non-conduction state.

The next period is a second zero-clear period PCL2. During the second zero-clear period PCL2, as shown in the part (F) in FIG. 7, the control signal CLP remains at the H level for a predetermined period of time, which causes the switching transistor CLP1-Tr of the node potential switching part 23 to remain in the conduction state for the predetermined period of time. This accordingly results in the retaining node ND23 of the signal retaining part 212 remaining at the reference potential VSS (for example, 0V). In parallel with this, as shown in the parts (D) and (E) in FIG. 7, the control signal SHR for the second sampling transistor SHR1-Tr of the signal retaining part 212 remains at the L level and the control signal SHS for the first sampling transistor SHS1-Tr remains at the H level, so that the first sampling transistor SHS1-Tr remains in the conduction state and the second sampling transistor SHR1-Tr remains in the non-conduction state. This clears, to 0V, the first sample-and-hold capacitor CS21 of the signal retaining part 212.

When the first sample-and-hold capacitor CS21 is cleared to 0V in the clear period and connected to the source follower transistor SF1-Tr of the photoelectric conversion reading part 211, the electrons are fed from the first sample-and-hold capacitor CS21. Accordingly, the first sample-and-hold capacitor CS21 serves as a dynamic current source.

The second zero-clear period PCL2 is followed by a signal reading period PRDS in which the read-out signal VSIG is read from the photoelectric conversion reading part 211 as the pixel signal.

In the signal reading period PRDS, a transfer period occupies a predetermined period of time. In the transfer period, the transfer transistor TG1-Tr in each photoelectric conversion reading part 211 remains selected and in the conduction state during a period in which the control signal TG is at the H level, so that the charges (electrons) produced by the photoelectric conversion and then stored in the photodiode PD21 are transferred to the floating diffusion FD21. After the transfer period ends, the control signal TG for the transfer transistor TG1-Tr is switched to the L level, so that the transfer transistor TG1-Tr is brought into the non-conduction state. In the photoelectric conversion reading part 211, the source follower transistor SF1-Tr converts the charges in the floating diffusion FD21 into a voltage signal at a level determined by the quantity of the charges (the potential) and outputs the voltage signal from the output node ND21 through the selection transistor SEL1-Tr as the read-out signal VSIG of a column output.

In all of the signal retaining parts 212 of the retaining part array 240, the following control is performed. In the signal retaining part 212, the control signal SHS continuously remains at the H level, so that the first sampling transistor SHS1-Tr remains in the conduction state.

In this way, the read-out signal VSIG output from the output node ND21 of the photoelectric conversion reading part 211 is transmitted to the corresponding signal retaining part 212 through the second signal line LSGN12 and retained in the first sample-and-hold capacitor CS21 through the first sampling transistor SHS1-Tr.

After the read-out signal VSIG is retained in the first sample-and-hold capacitor CS21, the control signal SHS is switched to the L level, so that the first sampling transistor SHS1-Tr is brought into the non-conduction state.

This ends the sampling period PSML. Following this, as shown in the part (C) in FIG. 7, the control signal SEL is switched to the L level, so that the selection transistor SEL1-Tr is brought into the non-conduction state. The bus reset signal BRST is then switched to the L level, so that the source terminal of the source follower transistor SF2-Tr of the output part 2124 is released from being fixed to 0V and constant current driving is thus enabled.

After this, as shown in the part (H) in FIG. 7, the power supply switching part 22 keeps the power supply line Vddpix, which is connected by to the drain terminal of the source follower transistor SF2-Tr of the output part 2124, remaining at the power supply potential VDD of the power supply line Vdd. An off-state setting period POS then starts, in which the source follower transistor SF2-Tr is set to the off state. During the off-state setting period POS, as shown in the part (F) in FIG. 7, the control signal CLP remains at the H level for a predetermined period of time, which causes the switching transistor CLP1-Tr of the node potential switching part 23 to remain in the conduction state for the predetermined period of time. This accordingly results in the retaining node ND23 of the signal retaining part 212 remaining at the reference potential VSS (for example, 0V) and the source follower transistor SF2-Tr being set to the off state. When the off-state setting period POS ends, as shown in the part (G) in FIG. 7, the node potential switching part 23 switches the power supply line Vclppix to the predetermined voltage VCLP level. In the photoelectric conversion reading part 211, for a predetermined period of time, the reset transistor RST1-Tr and the transfer transistor TG11-Tr remain in the conduction state, so that the floating diffusion FD21 and the photodiode PD21 are reset (the pixel is reset).

While these states are maintained, a retained signal reading operation is performed, in which the read-out reset signal VRST retained in the second sample-and-hold capacitor CR21 of the second sampling part 2123 and the read-out signal VSIG retained in the first sample-and-hold capacitor CS21 of the first sampling part 2122 are read out to the vertical signal line LSGN11. The retained signal reading operation is performed in a retained signal reading period PHRD, in which the power supply switching part 22 keeps the power supply line Vddpix, which is connected to the drain terminal of the source follower transistor SF2-Tr of the output part 2124, remaining at the power supply potential VDD of the power supply line Vdd. In addition, the node potential switching part 23 switches the power supply line Vclppix to the predetermined voltage VCLP level.

In a first initial value reading period PIVR1 within the retained signal reading period PHRD, as shown in the part (C) in FIG. 8, the control signal CLP remains at the H level for a predetermined period of time, which causes the switching transistor CLP1-Tr of the node potential switching part 23 to remain in the conduction state for the predetermined period of time. This accordingly results in the retaining node ND23 of the signal retaining part 212 remaining at the predetermined voltage VCLP level corresponding to the initial value. In this way, in each signal retaining part 212, the source follower transistor SF2-Tr, whose gate is connected to the node ND23, outputs a first initial value read-out signal VIVR, which is a conversion signal of a column output, to the vertical signal line LSGN11 at a level corresponding to the voltage retained in the node ND23 (the initial value). The first initial value read-out signal VIVR is fed to the reading circuit 40.

The first initial value reading period PIVR1 is followed by a retained reset signal reading period PHRR. During the retained reset signal reading period PHRR, as shown in the part (A) in FIG. 8, the control signal SHR for the second sampling transistor SHR1-Tr of the signal retaining part 212 remains at the H level, so that the second sampling transistor SHR1-Tr remains in the conduction state. This causes the read-out reset signal VRST retained in the second sample-and-hold capacitor CR21 is transferred to the retaining node ND23. In each signal retaining part 212, the source follower transistor SF2-Tr whose gate is connected to the node ND23 outputs, to vertical signal line LSGN11, the read-out reset signal VRST, which is a conversion signal of a column out, at a level corresponding to the voltage retained in the second sample-and-hold capacitor CR21 connected to the node ND23. The read-out reset signal VRST is fed to the reading circuit 40.

Subsequently, a second initial value reading period PIVR2 within the retained signal reading period PHRD starts. In the second initial value reading period PIVR2, as shown in the part (C) in FIG. 8, the control signal CLP remains at the H level for a predetermined period of time, which causes the switching transistor CLP1-Tr of the node potential switching part 23 to remain in the conduction state for the predetermined period of time. This accordingly results in the retaining node ND23 of the signal retaining part 212 remaining at the predetermined voltage VCLP level corresponding to the initial value. In this way, in each signal retaining part 212, the source follower transistor SF2-Tr, whose gate is connected to the node ND23, outputs a second initial value read-out signal VIVS, which is a conversion signal of a column output, to the vertical signal line LSGN11 at a level corresponding to the voltage retained in the node ND23 (the initial value). The second initial value read-out signal VIVS is fed to the reading circuit 40.

The second initial value reading period PIVR2 is followed by a retained read-out signal reading period PHSR. During the retained read-out signal reading period PHRR, as shown in the part (B) in FIG. 8, the control signal SHS for the first sampling transistor SHS1-Tr of the signal retaining part 212 remains at the H level, so that the first sampling transistor SHS1-Tr remains in the conduction state. This causes the read-out signal VSIG retained in the first sample-and-hold capacitor CS21 to be transferred to the retaining node ND23. In each signal retaining part 212, the source follower transistor SF2-Tr whose gate is connected to the node ND23 outputs, to the vertical signal line LSGN11, the read-out signal VSIG, which is a conversion signal of a column output, at a level corresponding to the voltage retained in the first sample-and-hold capacitor CS21 connected to the node ND23. The read-out signal VSIG is fed to the reading circuit 40.

Subsequently, the column reading circuit 40, which constitutes part of, for example, the reading part 70, amplifies and AD converts the read-out reset signal VRST and the read-out signal VSIG of the pixel signal pixout, and additionally calculates the difference between the signals {VRST-VSIG} and performs the CDS.

Just like after the end of the sampling period, an off-state setting period POS then starts, in which the source follower transistor SF2-Tr is set to the off state after the retained signal reading period PHRD ends.

As described above, in the first embodiment, the pixel part 20 is configured as a stacked CMOS image sensor including, for example, the pixel array 230 in which the photoelectric conversion reading parts 211 of the plurality of pixels 21 are arranged in a matrix pattern, and the retaining part array 240 in which the signal retaining parts 212 of the plurality of pixels 21 are arranged in a matrix pattern. The stacked CMOS image sensor is made up by the first substrate 110 and the second substrate 120. The signal retaining part 212 formed in the second substrate 120 is provided with the first sampling part 2122 and the second sampling part 2123, each of which is formed by one sampling transistor (1T) and one sampling capacitor (1C). The coupling node between the two sampling parts is the retaining node ND23 and is used as a bidirectional port. With such a configuration, the stacked CMOS image sensor is configured as a solid-state imaging element having a global shutter function that achieves substantially the same signal amplitude as in the differential reading scheme with four transistors. According to the first embodiment, the node potential switching part 23, which serves as a clamp circuit, and the source follower transistor SF2-Tr are connected to the merging point between the first sampling part 2122 and the second sampling part 2123, and the clamp voltage of the retaining node ND23 is controlled to be equal to the reference potential VSS (for example, 0V) or predetermined voltage VCLP. This allows the voltage at the merging point to dynamically change and allows the drain voltage of the source follower transistor SF2-Tr to dynamically changes to the reference potential VSS (for example, 0V) or power supply potential VDD. According to the first embodiment, sampling takes place while the source follower transistor SF2-Tr of the output part 2124 is in the strong inversion mode. This can increase the gate capacitance and increase the band limit capacitance.

Therefore, the solid-state imaging device 10 relating to the first embodiment can achieve the reduced increase in number of transistors, prevent the occurrence of signal amplitude loss in the sampling parts, maintain high pixel sensitivity and reduce input conversion noise.

More specifically, while the conventional art requires eight transistors, the first embodiment requires only four, which can contribute to accomplish a smaller size. The silicon area that is used for the transistors in the conventional art can now be used for MOS capacitors, which can contribute to reduce noise. The sampling capacitors can be zero-cleared without the need of additional transistors, which can contribute to achieve a smaller size. One of the sampling capacitors can be used as a band limiting element and, additionally, the parasitic capacitor can be used as a band limiting element. This can contribute to reduce noise. Furthermore, the first embodiment can advantageously use the common 4-Tr APS configuration for the pixels and be thus highly applicable.

Additionally, the solid-state imaging device 10 relating to the first embodiment can prevent the increase in configuration complexity and, at the same time, the reduction in area efficiency from the perspective of layout.

The solid-state imaging device 10 relating to the first embodiment has a stacked structure of the first substrate (upper substrate) 110 and the second substrate (lower substrate) 120. Accordingly, the first embodiment can maximize the value per cost since the first substrate 110 is basically formed only with NMOS elements and the pixel array can increase the effective pixel region to the maximum.

Second Embodiment

Figure 9:
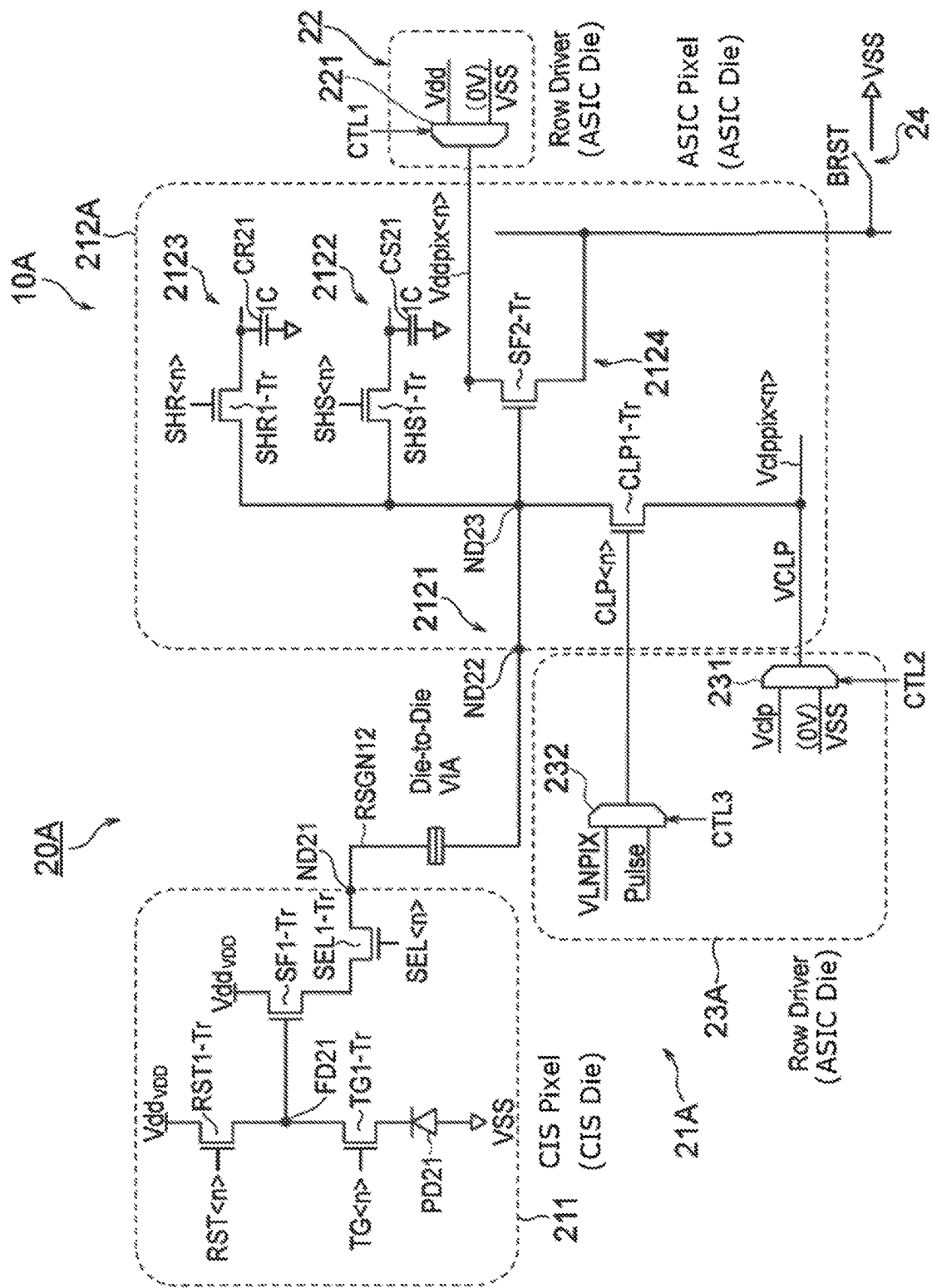
FIG. 9 is a circuit diagram illustrating an example configuration of a pixel of a solid-state imaging device relating to a second embodiment of the present invention.

FIG. 9 is a diagram showing an example configuration of a pixel of a solid-state imaging device relating to a second embodiment of the present invention.

The solid-state imaging device 10A relating to the second embodiment differs from the solid-state imaging device 10 relating to the above-described first embodiment in the following points. In the solid-state imaging device 10A relating to the second embodiment, the voltage CLP<n> designed to drive the switching transistor CLP1-Tr of the node potential switching part 23A can be switched between the pulse driving, which is required in the first embodiment, and the constant current bias voltage (VLNPIX). The switching is carried out by the selecting part 232 according to the control signal CTL3.

The second embodiment makes it possible not only to produce the same effects as in the above-described first embodiment but also to perform reading with a constant current without increasing the number of transistors. In this case, the voltage VCLP is set to 0V and the GND potential is fed.

Third Embodiment

Figure 10:
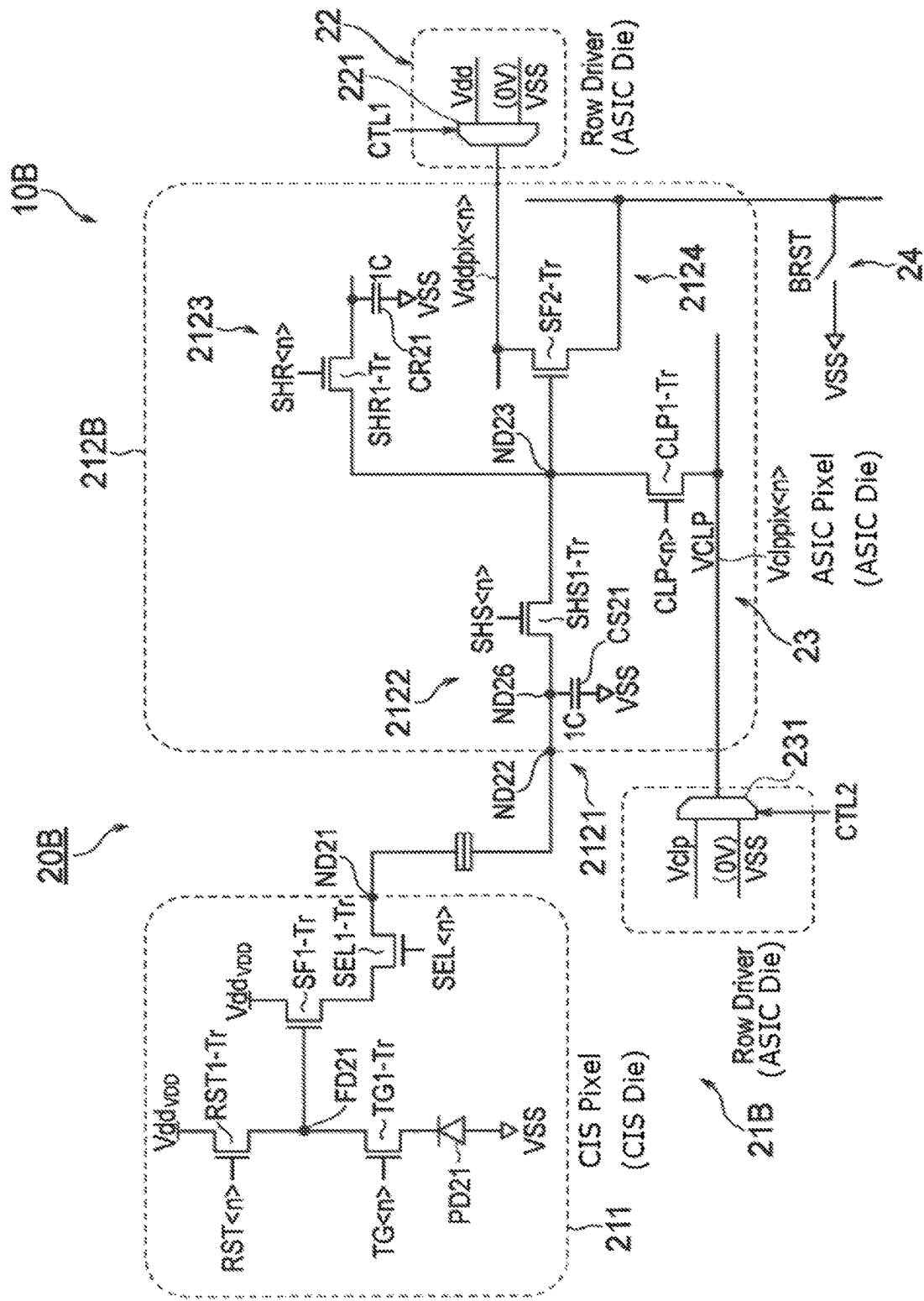
FIG. 10 is a circuit diagram illustrating an example configuration of a pixel of a solid-state imaging device relating to a third embodiment of the present invention.
Figure 11:
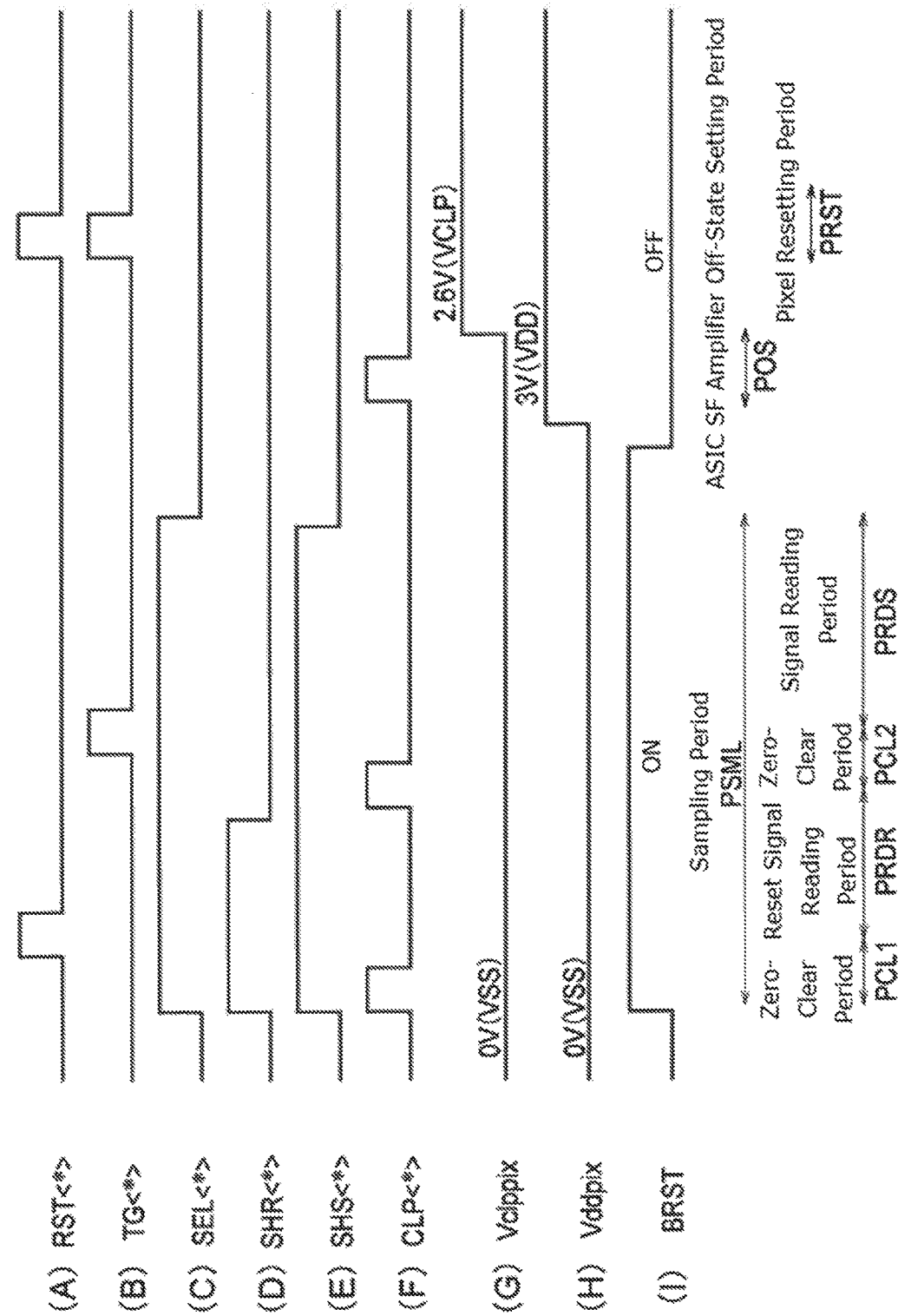
FIG. 11 is a timing chart including parts (A) to (I) to illustrate operations performed in a clear period and a sampling period mainly by the pixel part of the solid-state imaging device relating to the third embodiment of the present invention in a predetermined shutter mode.

FIG. 10 is a diagram showing an example configuration of a pixel of a solid-state imaging device relating to a third embodiment of the present invention. FIG. 11 is a timing chart to illustrate operations performed in a clear period and a sampling period mainly by the pixel part of the solid-state imaging device relating to the third embodiment of the present invention in a predetermined shutter mode.

The solid-state imaging device 10B relating to the third embodiment differs from the solid-state imaging devices 10, 10A relating to the above-described first and second embodiments in the following points. In the solid-state imaging device 10B relating to the third embodiment, the first sampling part 2122 is connected between the input node ND22 and the retaining node ND23 in the signal retaining part 212B. In the signal retaining part 212B, the second sampling transistor SHR1-Tr of the second sampling part 2123 is connected to the retaining node ND23, the first sample-and-hold capacitor CS21 of the first sampling part 2122 is connected to the input node ND22, and the first sampling transistor SHS1-Tr is connected between (i) the connection node ND26 between the first sample-and-hold capacitor CS21 and the input node NS22 and (ii) the retaining node ND23.

The reading operation is performed in the same manner as in the first embodiment except for that the first sampling transistor SHS1-Tr of the first sampling part 2122 remains in the conduction state in FIG. 11 during the reset signal reading period PRDR in the sampling period PSML as shown in the part (E). Thus, the reading operation is not described here in detail.

The third embodiment makes it possible not only to produce the same effects as the above-described first embodiment but also to produce the following effects. Since the first sampling part 2122 for the read-out signal VSIG is arranged on the reading path from the photoelectric conversion reading part 211, the parasitic capacitance generated in the retaining node ND23 can be minimized. This minimizes the reduction in gain caused by the charge sharing with the sampling capacitance during the reading operation, thereby reducing input conversion noise. The sampling capacitance arranged on the path imposes band limiting on the source follower transistor SF1-Tr and the selection transistor SEL1 of the photoelectric conversion reading part 211 positioned before this sampling capacitance, which reduces noise. This can consequently lower overall sampling noise. In addition, since the parasitic capacitances of the die-to-die vias are included in the sampling capacitance, the effective sampling capacitance can be increased. Furthermore, the same modification as made in the second embodiment allows constant current driving.

The solid-state imaging devices 10, 10A, 10B described above can be applied, as an imaging device, to electronic apparatuses such as digital cameras, video cameras, mobile terminals, surveillance cameras, and medical endoscope cameras.

Figure 12:
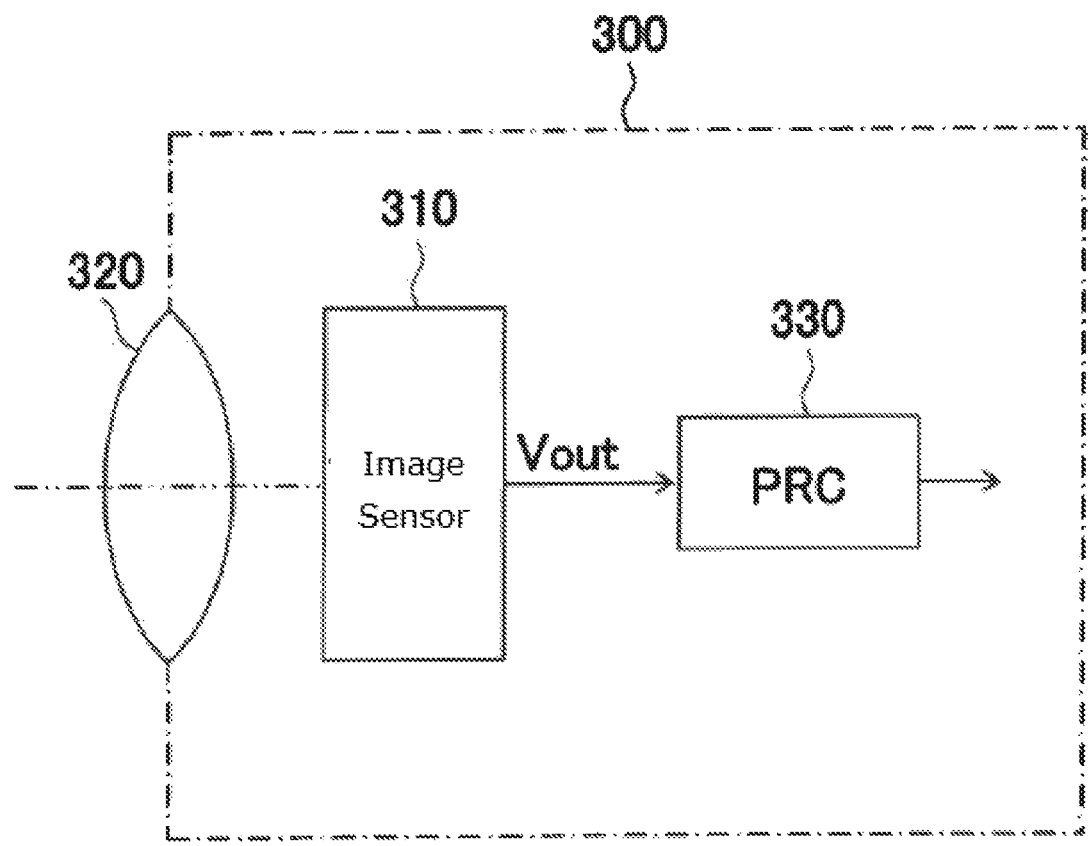
FIG. 12 shows an example configuration of an electronic apparatus to which the solid-state imaging devices relating to the embodiments of the present invention can be applied.

FIG. 12 shows an example of the configuration of an electronic apparatus including a camera system to which the solid-state imaging device according to the embodiments of the present invention is applied.

As shown in FIG. 12, the electronic apparatus 300 includes a CMOS image sensor 310 that can be constituted by the solid-state imaging device 10 according to the embodiments of the present invention. Further, the electronic apparatus 300 includes an optical system (such as a lens) 320 for redirecting the incident light to pixel regions of the CMOS image sensor 310 (to form a subject image). The electronic apparatus 300 includes a signal processing circuit (PRC) 330 for processing output signals of the CMOS image sensor 310.

The signal processing circuit 330 performs predetermined signal processing on the output signals of the CMOS image sensor 310. The image signals processed in the signal processing circuit 330 can be handled in various manners. For example, the image signals can be displayed as a video image on a monitor having a liquid crystal display, or the image signals can be printed by a printer or recorded directly on a storage medium such as a memory card.

As described above, a high-performance, compact, and low-cost camera system can be provided that includes the solid-state imaging device 10, 10A, 10B as the CMOS image sensor 310. Further, it is possible to produce electronic apparatuses such as surveillance cameras and medical endoscope cameras that are used for applications where cameras are required to be installed under restricted conditions such as the installation size, number of connectable cables, cable length, and installation height.

What is claimed is:

1. A solid-state imaging device comprising:
a pixel part having a pixel arranged therein, the pixel including a photoelectric conversion reading part and a signal retaining part;
a reading part for reading a pixel signal from the pixel part; and
a signal line to which a retained signal is output from the signal retaining part, wherein the pixel signal read from the pixel at least includes a pixel signal including a read-out signal and a read-out reset signal read from a pixel, wherein the photoelectric conversion reading part of the pixel at least includes:
an output node;
a photoelectric conversion element for storing therein, in a storage period, charges generated by photoelectric conversion;
a transfer element for transferring, in a transfer period, the charges stored in the photoelectric conversion element;
a floating diffusion to which the charges stored in the photoelectric conversion element are transferred through the transfer element;
a first source follower element for converting the charges in the floating diffusion into a voltage signal at a level corresponding to a quantity of the charges and outputting the voltage signal to the output node; and
a reset element for resetting, in a reset period, the floating diffusion to a predetermined potential, and
wherein the signal retaining part includes:
an input node;
a retaining node;
a first sampling part including a first sample-and-hold capacitor and a first switch element, the first sample-and-hold capacitor for retaining the read-out signal output from the output node of the photoelectric conversion reading part of the pixel and input into the input node, and the first switch element for selectively connecting the first sample-and-hold capacitor to the retaining node;
a second sampling part including a second sample-and-hold capacitor and a second switch element, the second sample-and-hold capacitor for retaining the read-out reset signal output from the output node of the photoelectric conversion reading part of the pixel and input into the input node, and the second switch element for selectively connecting the second sample-and-hold capacitor to the retaining node; and
an output part including a second source follower element for outputting, from a source terminal thereof to the signal line, a signal retained in the first sample-and-hold capacitor and a signal retained in the second sample-and-hold capacitor at a level corresponding to a voltage retained in the retaining node;
a power supply switching part for selectively connecting a drain of the second source follower element of the signal retaining part to one of a power supply potential or a reference potential; and
a node potential switching part for selectively setting the retaining node of the signal retaining part to one of a predetermined voltage level or the reference potential, wherein based on a determination that at least one of: the first sample-and-hold capacitor of the first sampling part of the signal retaining part or the second sample-and-hold capacitor of the second sampling part is to be cleared, the reading part is further configured to:
control the power supply switching part to connect the drain of the second source follower element to the reference potential;
control the node potential switching part to set the retaining node to the reference potential; and
maintain at least one of the first switch element of the first sampling part of the signal retaining part or the second switch element of the second sampling part in a conduction state.

2. The solid-state imaging device according to claim 1, wherein the input node and the retaining node are connected to each other, and wherein to the retaining node, the first switch element of the first sampling part and the second switch element of the second sampling part are connected in parallel.

3. The solid-state imaging device according to claim 1, wherein the first sampling part is connected between the input node and the retaining node, wherein to the retaining node, the second switch element of the second sampling part is connected, and wherein the first sample-and-hold capacitor of the first sampling part is connected to the input node, and the first switch element is connected between (i) a connecting node between the first sample-and-hold capacitor and the input node and (ii) the retaining node.

4. The solid-state imaging device according to claim 1, wherein, in the signal retaining part, the input node and the retaining node are connected to each other, and the first switch element of the first sampling part and the second switch element of the second sampling part are connected in parallel to the retaining node, the reading part is further configured to:

during a sampling period in which the pixel signal is read from the pixel,
control the power supply switching part to keep the drain of the second source follower element connected to the reference potential;
during a first clear period within the sampling period,
control the node potential switching part to keep the retaining node set to the reference potential, and
maintain the first switch element of the first sampling part of the signal retaining part and the second switch element of the second sampling part in a conduction state so that the first sample-and-hold capacitor of the first sampling part of the signal retaining part and the second sample-and-hold capacitor of the second sampling part are cleared;
in a reset signal reading period, in which the read-out reset signal is read as the pixel signal from the pixel, following the first clear period,
maintain the second switch element of the second sampling part in a conduction state for a predetermined period of time so that the read-out reset signal is retained in the second sample-and-hold capacitor;
during a second clear period following the reset signal reading period,
control the node potential switching part to keep the retaining node set to the reference potential, and
maintain the first switch element of the first sampling part of the signal retaining part in a conduction state so that the first sample-and-hold capacitor of the first sampling part of the signal retaining part is cleared; and
in a signal reading period, in which the read-out signal is read as the pixel signal from the pixel, following the second clear period,
maintain the first switch element of the first sampling part in a conduction state for a predetermined period of time so that the read-out signal is retained in the first sample-and-hold capacitor.

5. The solid-state imaging device according to claim 1, wherein, in the signal retaining part, the first sampling part is connected between the input node and the retaining node, the second switch element of the second sampling part is connected to the retaining node, and the first sample-and-hold capacitor of the first sampling part is connected to the input node, and the first switch element is connected between (i) a connecting node between the first sample-and-hold capacitor and the input node and (ii) the retaining node, the reading part is further configured to:

during a sampling period in which the pixel signal is read from the pixel,
control the power supply switching part to keep the drain of the second source follower element connected to the reference potential;
during a first clear period within the sampling period,
control the node potential switching part to keep the retaining node set to the reference potential, and
maintain the first switch element of the first sampling part of the signal retaining part and the second switch element of the second sampling part in a conduction state so that the first sample-and-hold capacitor of the first sampling part of the signal retaining part and the second sample-and-hold capacitor of the second sampling part are cleared;
in a reset signal reading period, in which the read-out reset signal is read as the pixel signal from the pixel, following the first clear period, while keeping the first switch element of the first sampling part in a conduction state,
maintain the second switch element of the second sampling part in a conduction state for a predetermined period of time so that the read-out reset signal is retained in the second sample-and-hold capacitor;
during a second clear period following the reset signal reading period, while keeping the second switch element of the second sampling part in a non-conduction state,
control the connecting node potential switching part to keep the retaining node set to the reference potential, and
maintain the first switch element of the first sampling part of the signal retaining part in a conduction state so that the first sample-and-hold capacitor of the first sampling part of the signal retaining part is cleared; and
during a signal reading period, in which the read-out signal is read as the pixel signal from the pixel, following the second clear period,
maintain the first switch element of the first sampling part in a conduction state for a predetermined period of time so that the read-out signal is retained in the first sample-and-hold capacitor.

6. The solid-state imaging device according to claim 4, comprising:
a bus resetting part for, during the sampling period, keeping a source terminal of the second source follower element of the signal retaining part to a level of the reference potential.

7. The solid-state imaging device according to claim 5, comprising:
a bus resetting part for, during the sampling period, keeping a source terminal of the second source follower element of the signal retaining part to a level of the reference potential.

8. The solid-state imaging device according to claim 4, wherein based on a retained signal reading operation for reading out to the signal line the read-out reset signal retained in the second sample-and-hold capacitor of the second sampling part and the read-out signal retained in the first sample-and-hold capacitor of the first sampling part being performed, the reading part is further configured to:
during a retained signal reading period,
control the power supply switching part to keep the drain of the second source follower element connected to the power supply potential;

in a first initial value reading period within the retained signal reading period,
    control the node potential switching part to keep the retaining node set at a predetermined potential corresponding to an initial value for a predetermined period of time so that the second source follower element of the output part reads out to the signal line a conversion signal at a level corresponding to the predetermined potential;
in a retained reset signal reading period following the first initial value reading period,
    maintain the second switch element of the second sampling part in a conduction state for a predetermined period of time so that the second source follower element of the output part reads out to the signal line a conversion signal corresponding to a reset signal retained in the second sample-and-hold capacitor;
in a second initial value reading period following the retained reset signal reading period,
    control the node potential switching part to keep the retaining node set to a predetermined potential corresponding to an initial value for a predetermined period of time so that the second source follower element of the output part reads out to the signal line a conversion signal at a level corresponding to the predetermined potential; and
in a retained read-out signal reading period following the second initial value reading period,
    maintain the first switch element of the first sampling part in a conduction state for a predetermined period of time so that the second source follower element of the output part reads out to the signal line a conversion signal corresponding to a signal retained in the first sample-and-hold capacitor.

9. The solid-state imaging device according to claim 5, wherein based on a retained signal reading operation for reading out to the signal line the read-out reset signal retained in the second sample-and-hold capacitor of the second sampling part and the read-out signal retained in the first sample-and-hold capacitor of the first sampling part being performed, the reading part is further configured to:
during a retained signal reading period,
    control the power supply switching part to keep the drain of the second source follower element connected to the power supply potential;
in a first initial value reading period within the retained signal reading period,
    control the node potential switching part to keep the retaining node set to a predetermined potential corresponding to an initial value for a predetermined period of time so that the second source follower element of the output part reads out to the signal line a conversion signal at a level corresponding to the predetermined potential;
in a retained reset signal reading period following the first initial value reading period,
    maintain the second switch element of the second sampling part in a conduction state for a predetermined period of time so that the second source follower element of the output part reads out to the signal line a conversion signal corresponding to the retained reset signal retained in the second sample-and-hold capacitor;
in a second initial value reading period following the retained reset signal reading period,
    control the node potential switching part to keep the retaining node set to a predetermined potential corresponding to an initial value for a predetermined period of time so that the second source follower element of the output part reads out to the signal line a conversion signal at a level corresponding to the predetermined potential; and
in a retained read-out signal reading period following the second initial value reading period,
    maintain the first switch element of the first sampling part in a conduction state for a predetermined period of time so that the second source follower element of the output part reads out to the signal line a conversion signal corresponding to the signal retained in the first sample-and-hold capacitor.

10. The solid-state imaging device according to claim 1, wherein the node potential switching part includes:
    a selecting part for selecting one of the predetermined voltage level or the reference potential; and
    a switching transistor for selectively connecting an output from the selecting part to the retaining node of the signal retaining part,
    wherein the switching transistor serves as both a switch element and a current source.

11. The solid-state imaging device according to claim 8, wherein the reading part is further configured to:
    after at least the sampling period ends and before performing the retained signal reading operation, set the second source follower element of the output part to an off state.

12. The solid-state imaging device according to claim 11, wherein the reading part is further configured to:
    after the sampling period ends and before performing the retained signal reading operation, while the drain of the second source follower element is kept at the power supply potential,
    control the node potential switching part to set the retaining node to the reference potential for a predetermined period of time so that the second source follower element of the output part is set to an off state.

13. The solid-state imaging device according to claim 1, comprising:
    a first substrate; and
    a second substrate,
    wherein the first substrate and the second substrate have a stacked structure in which the first substrate and the second substrate are connected through a connection part,
    wherein the first substrate at least has at least a portion of the photoelectric conversion reading part of the pixel formed therein, and
    wherein the second substrate at least has at least a portion of the reading part, the signal line and the signal retaining part formed therein.

14. A method for driving a solid-state imaging device, the method comprising:
    reading, via a reading part of the solid-state imaging device, a pixel signal from a pixel part, wherein the solid-state imaging device comprises:
        the pixel part having a pixel arranged therein, the pixel including a photoelectric conversion reading part and a signal retaining part;
        the reading part; and
        a signal line;
    outputting a retained signal from the signal retaining part, wherein the pixel signal read from the pixel at least includes a pixel signal including a read-out signal and a read-out reset signal read from the pixel, wherein the photoelectric conversion reading part of the pixel at least includes: an output node, a photoelectric conversion element, a transfer element, a floating diffusion, a first source follower element, and a reset element;

storing, via the photoelectric conversion element, in a storage period, charges generated by photoelectric conversion;

transferring, via the transfer element, in a transfer period, the charges stored in the photoelectric conversion element;

transferring, via the floating diffusion, the charges stored in the photoelectric conversion element through the transfer element;

converting, via the first source follower element, the charges in the floating diffusion into a voltage signal at a level corresponding to a quantity of the charges;

outputting, via the first source follower element, the voltage signal to the output node;

resetting, via the reset element, in a reset period, the floating diffusion to a predetermined potential, wherein the signal retaining part includes: an input node, a retaining node, a first sampling part including a first sample-and-hold capacitor and a first switch element, a second sampling part including a second sample-and-hold capacitor and a second switch element, and an output part including a second source follower element;

retaining, via the first sample-and-hold capacitor, the read-out signal output from the output node of the photoelectric conversion reading part of the pixel and input into the input node;

connecting, selectively, via the first switch element, the first sample-and-hold capacitor to the retaining node;

retaining, via the second sample-and-hold capacitor, the read-out reset signal output from the output node of the photoelectric conversion reading part of the pixel and input into the input node;

connecting, selectively, via the second switch element, the second sample-and-hold capacitor to the retaining node;

outputting, via the second source follower element, from a source terminal thereof to the signal line, a signal retained in the first sample-and-hold capacitor and a signal retained in the second sample-and-hold capacitor at a level corresponding to a voltage retained in the retaining node;

connecting, selectively, via a power supply switching part of the solid-state imaging device, a drain of the second source follower element of the signal retaining part to one of a power supply potential or a reference potential;

setting, selectively, via a node potential switching part of the solid-state imaging device, the retaining node of the signal retaining part to one of a predetermined voltage level or the reference potential, and wherein in the signal retaining part, the input node and the retaining node are connected to each other, and the first switch element of the first sampling part and the second switch element of the second sampling part are connected in parallel to the retaining node;

reading, during a sampling period, the pixel signal from the pixel;

maintaining, via the power supply switching part, the drain of the second source follower element's connection to the reference potential;

maintaining, during a first clear period within the sampling period, via the node potential switching part, the retaining node being set to the reference potential;

maintaining the first switch element of the first sampling part of the signal retaining part and the second switch element of the second sampling part in a conduction state so that the first sample-and-hold capacitor of the first sampling part of the signal retaining part and the second sample-and-hold capacitor of the second sampling part are cleared;

maintaining, during a reset signal reading period, in which the read-out reset signal is read as the pixel signal from the pixel, following the first clear period, the second switch element of the second sampling part as being in a conduction state for a predetermined period of time so that the read-out reset signal is retained in the second sample-and-hold capacitor;

maintaining, during a second clear period following the reset signal reading period, via the node potential switching part, that the retaining node as being set to the reference potential;

maintaining, during the second clear period following the reset signal reading period, that the first switch element of the first sampling part of the signal retaining part is in a conduction state so that the first sample-and-hold capacitor of the first sampling part of the signal retaining part is cleared;

maintaining, during a signal reading period, in which the read-out signal is read as the pixel signal from the pixel, following the second clear period, that the first switch element of the first sampling part is in a conduction state for a predetermined period of time so that the read-out signal is retained in the first sample-and-hold capacitor;

determining that at least one of the first sample-and-hold capacitor of the first sampling part of the signal retaining part or the sample-and-hold capacitor of the second sampling part is to be cleared;

controlling the power supply switching part to connect the drain of the second source follower element to the reference potential;

controlling the node potential switching part to set the retaining node to the reference potential; and maintaining at least one of the first switch element of the first sampling part of the signal retaining part or the second switch element of the second sampling part in a conduction state.

15. A method for driving a solid-state imaging device, the method comprising:

reading, via a reading part of the solid-state imaging device, a pixel signal from a pixel part, wherein the solid-state imaging device comprises:
  the pixel part having a pixel arranged therein, the pixel including a photoelectric conversion reading part and a signal retaining part;
  the reading part; and
  a signal line;

outputting a retained signal from the signal retaining part, wherein the pixel signal read from the pixel at least includes a pixel signal including a read-out signal and a read-out reset signal read from the pixel, wherein the photoelectric conversion reading part of the pixel at least includes: an output node, a photoelectric conversion element, a transfer element, a floating diffusion, a first source follower element, and a reset element;

storing, via the photoelectric conversion element, in a storage period, charges generated by photoelectric conversion;

transferring, via the transfer element, in a transfer period, the charges stored in the photoelectric conversion element;

transferring, via the floating diffusion, the charges stored in the photoelectric conversion element through the transfer element;

converting, via the first source follower element, the charges in the floating diffusion into a voltage signal at a level corresponding to a quantity of the charges;

outputting, via the first source follower element, the voltage signal to the output node;

resetting, via the reset element, in a reset period, the floating diffusion to a predetermined potential, wherein the signal retaining part includes: an input node, a retaining node, a first sampling part including a first sample-and-hold capacitor and a first switch element, a second sampling part including a second sample-and-hold capacitor and a second switch element, and an output part including a second source follower element;

retaining, via the first sample-and-hold capacitor, the read-out signal output from the output node of the photoelectric conversion reading part of the pixel and input into the input node;

connecting, selectively, via the first switch element, the first sample-and-hold capacitor to the retaining node;

retaining, via the second sample-and-hold capacitor, the read-out reset signal output from the output node of the photoelectric conversion reading part of the pixel and input into the input node;

connecting, selectively, via the second switch element, the second sample-and-hold capacitor to the retaining node;

outputting, via the second source follower element, from a source terminal thereof to the signal line, a signal retained in the first sample-and-hold capacitor and a signal retained in the second sample-and-hold capacitor at a level corresponding to a voltage retained in the retaining node;

connecting, selectively, via a power supply switching part of the solid-state imaging device, a drain of the second source follower element of the signal retaining part to one of a power supply potential or a reference potential;

setting, selectively, via a node potential switching part of the solid-state imaging device, the retaining node of the signal retaining part to one of a predetermined voltage level or the reference potential, and wherein in the signal retaining part, the first sampling part is connected between the input node and the retaining node, the second switch element of the second sampling part is connected to the retaining node, and the first sample-and-hold capacitor of the first sampling part is connected to the input node, and the first switch element is connected between (i) a connecting node between the first sample-and-hold capacitor and the input node and (ii) the retaining node;

reading, during a sampling period, the pixel signal from the pixel;

maintaining, via the power supply switching part, the drain of the second source follower element's connection to the reference potential;

maintaining, during a first clear period within the sampling period, via the node potential switching part, the retaining node being set to the reference potential;

maintaining the first switch element of the first sampling part of the signal retaining part and the second switch element of the second sampling part in a conduction state so that the first sample-and-hold capacitor of the first sampling part of the signal retaining part and the second sample-and-hold capacitor of the second sampling part are cleared;

maintaining, during a reset signal reading period, in which the read-out reset signal is read as the pixel signal from the pixel, following the first clear period, while the first switch element of the first sampling part as being in a conduction state;

maintaining the second switch element of the second sampling part in a conduction state for a predetermined period of time so that the read-out reset signal is retained in the second sample-and-hold capacitor;

maintaining, during a second clear period following the reset signal reading period, while the second switch element of the second sampling part is in a non-conduction state, via the node potential switching part, the retaining node as being set to the reference potential, and the first switch element of the first sampling part of the signal retaining part is kept in a conduction state so that the first sample-and-hold capacitor of the first sampling part of the signal retaining part is cleared; and during a signal reading period, in which the read-out signal is read as the pixel signal from the pixel, following the second clear period, the first switch element of the first sampling part is kept in a conduction state for a predetermined period of time so that the read-out signal is retained in the first sample-and-hold capacitor;

determining that at least one of the first sample-and-hold capacitor of the first sampling part of the signal retaining part or the sample-and-hold capacitor of the second sampling part is to be cleared;

controlling the power supply switching part to connect the drain of the second source follower element to the reference potential;

controlling the node potential switching part to set the retaining node to the reference potential; and maintaining at least one of the first switch element of the first sampling part of the signal retaining part or the second switch element of the second sampling part in a conduction state.

16. The method for driving a solid-state imaging device, according to claim 14, wherein:

based on a retained signal reading operation being performed for reading out to the signal line the read-out reset signal retained in the second sample-and-hold capacitor of the second sampling part and the read-out signal retained in the first sample-and-hold capacitor of the first sampling part, the method further comprises:

maintaining, during a retained signal reading period, via the power supply switching part, the drain of the second source follower element connected to the power supply potential;

maintaining, during a first initial value reading period within the retained signal reading period, via the node potential switching part, the retaining node set to a predetermined potential corresponding to an initial value for a predetermined period of time so that the second source follower element of the output part reads out to the signal line a conversion signal at a level corresponding to the predetermined potential;

maintaining, during a retained reset signal reading period following the first initial value reading period, the second switch element of the second sampling part in a conduction state for a predetermined period of time so that the second source follower element of the output part reads out to the signal line a conversion signal corresponding to a reset signal retained in the second sample-and-hold capacitor;

maintaining, during a second initial value reading period following the retained reset signal reading period, via the node potential switching part, the retaining node as being set to a predetermined potential corresponding to an initial value for a predetermined period of time so that the second source follower element of the output part reads out to the signal line a conversion signal at a level corresponding to the predetermined potential; and maintaining, during a retained read-out signal reading period following the second initial value reading period, the first switch element of the first sampling part in a conduction state for a predetermined period of time so that the second source follower element of the output part reads out to the signal line a conversion signal corresponding to a signal retained in the first sample-and-hold capacitor.

17. The method for driving a solid-state imaging device, according to claim 15, wherein:

based on a retained signal reading operation being performed for reading out to the signal line the read-out reset signal retained in the second sample-and-hold capacitor of the second sampling part and the read-out signal retained in the first sample-and-hold capacitor of the first sampling part, the method further comprises:

maintaining, during a retained signal reading period, via the power supply switching part, the drain of the second source follower element connected to the power supply potential;

maintaining, during a first initial value reading period within the retained signal reading period, via the node potential switching part, the retaining node set to a predetermined potential corresponding to an initial value for a predetermined period of time so that the second source follower element of the output part reads out to the signal line a conversion signal at a level corresponding to the predetermined potential;

maintaining, during a retained reset signal reading period following the first initial value reading period, the second switch element of the second sampling part in a conduction state for a predetermined period of time so that the second source follower element of the output part reads out to the signal line a conversion signal corresponding to the reset signal retained in the second sample-and-hold capacitor;

maintaining, during a second initial value reading period following the retained reset signal reading period, via the node potential switching part, the retaining node set to a predetermined potential corresponding to an initial value for a predetermined period of time so that the second source follower element of the output part reads out to the signal line a conversion signal at a level corresponding to the predetermined potential; and maintaining, during a retained read-out signal reading period following the second initial value reading period, the first switch element of the first sampling part in a conduction state for a predetermined period of time so that the second source follower element of the output part reads out to the signal line a conversion signal corresponding to the signal retained in the first sample-and-hold capacitor.

18. An electronic apparatus comprising:

a solid-state imaging device; and an optical system for forming a subject image on the solid-state imaging device, wherein the solid-state imaging device includes:

a pixel part having a pixel arranged therein, the pixel including a photoelectric conversion reading part and a signal retaining part;

a reading part for reading a pixel signal from the pixel part; and a signal line to which a retained signal is output from the signal retaining part, wherein the pixel signal read from the pixel at least includes:

a pixel signal including a read-out signal and a read-out reset signal read from the pixel, wherein the photoelectric conversion reading part of the pixel at least includes:

an output node;

a photoelectric conversion element for storing therein, in a storage period, charges generated by photoelectric conversion;

a transfer element for transferring, in a transfer period, the charges stored in the photoelectric conversion element;

a floating diffusion to which the charges stored in the photoelectric conversion element are transferred through the transfer element;

a first source follower element for converting the charges in the floating diffusion into a voltage signal at a level corresponding to a quantity of the charges and outputting the voltage signal to the output node; and a reset element for resetting, in a reset period, the floating diffusion to a predetermined potential, and wherein the signal retaining part includes:

an input node;

a retaining node;

a first sampling part including a first sample-and-hold capacitor and a first switch element, the first sample-and-hold capacitor for retaining the read-out signal output from the output node of the photoelectric conversion reading part of the pixel and input into the input node, and the first switch element for selectively connecting the first sample-and-hold capacitor to the retaining node;

a second sampling part including a second sample-and-hold capacitor and a second switch element, the second sample-and-hold capacitor for retaining the read-out reset signal output from the output node of the photoelectric conversion reading part of the pixel and input into the input node, and the second switch element for selectively connecting the second sample-and-hold capacitor to the retaining node; and an output part including a second source follower element for outputting, from a source terminal thereof to the signal line, a signal retained in the first sample-and-hold capacitor and a signal retained in the second sample-and-hold capacitor at a level corresponding to a voltage retained at the retaining node, wherein the solid-state imaging device further comprises:

a power supply switching part for selectively connecting a drain of the second source follower element of the signal retaining part to one of a power supply potential or a reference potential; and a node potential switching part for selectively setting the retaining node of the signal retaining part to one of a predetermined voltage level or the reference potential, and wherein based on a determination that at least one of the first sample-and-hold capacitor of the first sampling part of the signal retaining part or the sample-and-hold capacitor of the second sampling part is to be cleared, the reading part is further configured to:

control the power supply switching part to connect the drain of the second source follower element to the reference potential;

control the node potential switching part to set the retaining node to the reference potential; and maintain at least one of the first switch element of the first sampling part of the signal retaining part or the second switch element of the second sampling part in a conduction state.

* * * * *